US008816021B2

(12) United States Patent
Mizori et al.

(10) Patent No.: US 8,816,021 B2
(45) Date of Patent: Aug. 26, 2014

(54) CURABLE COMPOSITION WITH RUBBER-LIKE PROPERTIES

(75) Inventors: Farhad G Mizori, San Diego, CA (US); Stephen M Dershem, San Diego, CA (US)

(73) Assignee: Designer Molecules, Inc., San Diego, CA (US)

( * ) Notice: Subject to any disclaimer, the term of this patent is extended or adjusted under 35 U.S.C. 154(b) by 139 days.

(21) Appl. No.: 13/229,609

(22) Filed: Sep. 9, 2011

(65) Prior Publication Data

US 2012/0065336 A1    Mar. 15, 2012

Related U.S. Application Data

(60) Provisional application No. 61/381,927, filed on Sep. 10, 2010.

(51) Int. Cl.
| | | |
|---|---|---|
| *C09J 175/16* | (2006.01) | |
| *C08L 75/16* | (2006.01) | |
| *C09J 125/14* | (2006.01) | |
| *C08G 18/67* | (2006.01) | |
| *C08G 18/79* | (2006.01) | |
| *C08G 18/72* | (2006.01) | |
| *C08G 18/81* | (2006.01) | |
| *C08K 5/37* | (2006.01) | |

(52) U.S. Cl.
CPC .............. *C08L 75/16* (2013.01); *C09J 125/14* (2013.01); *C08G 18/672* (2013.01); *C08G 18/792* (2013.01); *C08G 18/724* (2013.01); *C08G 18/8175* (2013.01); *C08K 5/37* (2013.01)
USPC .......................................... 525/454; 525/301

(58) Field of Classification Search
CPC ... C09J 125/14; C08G 18/672; C08G 18/724; C08G 18/792; C08G 18/8175; C08L 75/16; C08K 5/37
USPC .................................. 525/301, 454
See application file for complete search history.

(56) References Cited

U.S. PATENT DOCUMENTS

| | | | |
|---|---|---|---|
| 4,968,738 A | 11/1990 | Dershem | |
| 4,985,471 A * | 1/1991 | Ohta et al. ........ | 522/27 |
| 5,045,127 A | 9/1991 | Dershem et al. | |
| 5,064,480 A | 11/1991 | Dershem et al. | |
| 5,232,962 A | 8/1993 | Dershem et al. | |
| 5,306,333 A | 4/1994 | Dershem et al. | |
| 5,358,992 A | 10/1994 | Dershem et al. | |
| 5,403,389 A | 4/1995 | Dershem | |
| 5,437,964 A | 8/1995 | Lapin et al. | |
| 5,447,988 A | 9/1995 | Dershem et al. | |
| 5,489,641 A | 2/1996 | Dershem | |
| 5,567,761 A | 10/1996 | Song | |
| 5,596,669 A | 1/1997 | Murphy et al. | |
| 5,646,241 A | 7/1997 | Dershem et al. | |
| 5,717,034 A | 2/1998 | Dershem et al. | |
| 5,718,941 A | 2/1998 | Dershem et al. | |
| 5,753,748 A | 5/1998 | Dershem et al. | |
| 5,861,111 A | 1/1999 | Dershem et al. | |
| 5,880,170 A | 3/1999 | Imura et al. | |
| 5,969,036 A | 10/1999 | Dershem | |
| 5,973,166 A | 10/1999 | Mizori et al. | |
| 6,034,194 A | 3/2000 | Dershem | |
| 6,034,195 A | 3/2000 | Dershem | |
| 6,121,358 A | 9/2000 | Dershem et al. | |
| 6,211,320 B1 | 4/2001 | Dershem et al. | |
| 6,265,530 B1 | 7/2001 | Herr et al. | |
| 6,281,314 B1 | 8/2001 | Tong et al. | |
| 6,423,780 B1 | 7/2002 | Dershem et al. | |
| 6,429,281 B1 | 8/2002 | Dershem et al. | |
| 6,521,731 B2 | 2/2003 | Dershem et al. | |
| 6,620,946 B2 | 9/2003 | Dershem et al. | |
| 6,743,852 B2 | 6/2004 | Dershem et al. | |
| 6,790,597 B2 | 9/2004 | Dershem | |
| 6,825,245 B2 | 11/2004 | Dershem | |
| 6,831,132 B2 | 12/2004 | Liu et al. | |
| 6,852,814 B2 | 2/2005 | Dershem et al. | |
| 6,916,856 B2 | 7/2005 | Dershem | |
| 6,946,523 B2 | 9/2005 | Dershem et al. | |
| 6,960,636 B2 | 11/2005 | Dershem et al. | |
| 6,963,001 B2 | 11/2005 | Dershem et al. | |
| 7,102,015 B2 | 9/2006 | Dershem et al. | |
| 7,119,160 B2 | 10/2006 | Kodama et al. | |
| 7,157,587 B2 | 1/2007 | Mizori et al. | |
| 7,176,044 B2 | 2/2007 | Forray et al. | |
| 7,199,249 B2 | 4/2007 | Liu et al. | |
| 7,208,566 B2 | 4/2007 | Mizori et al. | |
| 7,285,613 B2 | 10/2007 | Dershem et al. | |
| 7,309,724 B2 | 12/2007 | Dershem et al. | |
| 7,517,925 B2 | 4/2009 | Dershem et al. | |
| 7,678,879 B2 | 3/2010 | Dershem | |

(Continued)

FOREIGN PATENT DOCUMENTS

| | | |
|---|---|---|
| JP | H05-345880 | 12/1993 |
| JP | H10-505599 | 6/1998 |

(Continued)

OTHER PUBLICATIONS

Soucek et al. J. Appl. Polym. Sci. 2009, 113, 2173-2185.*

(Continued)

*Primary Examiner* — Mark Kaucher
(74) *Attorney, Agent, or Firm* — The Law Office of Jane K. Babin, Professional Corporation; Jane K. Babin

(57) ABSTRACT

Low viscosity, radiation curable compositions have been developed that produce plastics with silicone rubber-like properties. These compositions have also been shown to give great adhesion to plastics. The combination of an ethylenically unsaturated oligomer with di- or polythiol compound, reactive diluents and a radical initiator will produce these properties. These materials can find use in many areas such as: Electronics packaging, displays, conformal coatings, seals, gaskets, fiber optics coatings, and golf ball coatings.

20 Claims, No Drawings

(56) References Cited

U.S. PATENT DOCUMENTS

| | | |
|---|---|---|
| 7,777,064 B2 | 8/2010 | Mizori |
| 7,786,234 B2 | 8/2010 | Dershem et al. |
| 7,786,248 B2 | 8/2010 | Dershem |
| 7,795,362 B2 | 9/2010 | Dershem |
| 7,868,113 B2 | 1/2011 | Dershem |
| 7,875,688 B2 | 1/2011 | Dershem et al. |
| 7,884,174 B2 | 2/2011 | Mizori et al. |
| 7,928,153 B2 | 4/2011 | Dershem |
| 8,008,419 B2 | 8/2011 | Dershem |
| 8,013,104 B2 | 9/2011 | Dershem |
| 8,039,663 B2 | 10/2011 | Dershem |
| 8,043,534 B2 | 10/2011 | Dershem |
| 2002/0062923 A1 | 5/2002 | Forray |
| 2002/0099168 A1 | 7/2002 | Dershem et al. |
| 2002/0188137 A1 | 12/2002 | Dershem et al. |
| 2002/0193541 A1 | 12/2002 | Dershem et al. |
| 2002/0198356 A1 | 12/2002 | Dershem et al. |
| 2003/0008992 A1 | 1/2003 | Dershem et al. |
| 2003/0055121 A1 | 3/2003 | Dershem et al. |
| 2003/0060531 A1 | 3/2003 | Dershem et al. |
| 2003/0087999 A1 | 5/2003 | Dershem et al. |
| 2003/0109666 A1 | 6/2003 | Dershem et al. |
| 2003/0125551 A1 | 7/2003 | Dershem et al. |
| 2003/0199638 A1 | 10/2003 | Liu et al. |
| 2003/0208016 A1 | 11/2003 | Dershem et al. |
| 2003/0236362 A1* | 12/2003 | Bluem et al. ................ 525/530 |
| 2004/0006166 A1 | 1/2004 | Liu et al. |
| 2004/0019224 A1 | 1/2004 | Dershem et al. |
| 2004/0077798 A1 | 4/2004 | Dershem et al. |
| 2004/0082724 A1 | 4/2004 | Dershem et al. |
| 2004/0102566 A1 | 5/2004 | Forray et al. |
| 2004/0123948 A1 | 7/2004 | Dershem et al. |
| 2004/0225026 A1 | 11/2004 | Mizori et al. |
| 2004/0225045 A1 | 11/2004 | Forray |
| 2004/0225059 A1 | 11/2004 | Mizori et al. |
| 2005/0101723 A1* | 5/2005 | Zhao ........................... 524/555 |
| 2005/0107542 A1 | 5/2005 | Liu et al. |
| 2005/0136620 A1 | 6/2005 | Dershem et al. |
| 2005/0137277 A1 | 6/2005 | Dershem et al. |
| 2005/0267254 A1 | 12/2005 | Mizori et al. |
| 2005/0272888 A1 | 12/2005 | Dershem et al. |
| 2006/0009578 A1 | 1/2006 | Dershem |
| 2006/0063014 A1 | 3/2006 | Forray |
| 2006/0069232 A1 | 3/2006 | Dershem |
| 2006/0112536 A1* | 6/2006 | Herweck et al. ................ 29/592 |
| 2006/0142517 A1 | 6/2006 | Dershem |
| 2007/0155869 A1 | 7/2007 | Dershem et al. |
| 2007/0205399 A1 | 9/2007 | Mizori |
| 2007/0299154 A1 | 12/2007 | Dershem et al. |
| 2008/0017308 A1 | 1/2008 | Dershem et al. |
| 2008/0075961 A1 | 3/2008 | Mizori |
| 2008/0075963 A1 | 3/2008 | Dershem |
| 2008/0075965 A1 | 3/2008 | Dershem |
| 2008/0103240 A1 | 5/2008 | Dershem |
| 2008/0142158 A1 | 6/2008 | Dershem |
| 2008/0146738 A1 | 6/2008 | Dershem |
| 2008/0160315 A1 | 7/2008 | Forray et al. |
| 2008/0191173 A1 | 8/2008 | Dershem et al. |
| 2008/0210375 A1 | 9/2008 | Dershem et al. |
| 2008/0251935 A1 | 10/2008 | Dersham |
| 2008/0257493 A1 | 10/2008 | Dershem |
| 2008/0262191 A1 | 10/2008 | Mizori |
| 2009/0061244 A1 | 3/2009 | Dershem |
| 2009/0215940 A1 | 8/2009 | Dershem |
| 2009/0288768 A1 | 11/2009 | Dershem |
| 2010/0041803 A1 | 2/2010 | Dershem |
| 2010/0041823 A1 | 2/2010 | Dershem |
| 2010/0041832 A1 | 2/2010 | Dershem |
| 2010/0041845 A1 | 2/2010 | Dershem et al. |
| 2010/0056671 A1 | 3/2010 | Dershem |
| 2010/0063184 A1 | 3/2010 | Dershem |
| 2010/0113643 A1 | 5/2010 | Dershem |
| 2010/0144977 A1 | 6/2010 | Dershem |
| 2010/0249276 A1 | 9/2010 | Dershem |
| 2011/0017400 A1 | 1/2011 | Dershem |
| 2011/0152466 A1 | 6/2011 | Dershem |

FOREIGN PATENT DOCUMENTS

| | | | |
|---|---|---|---|
| WO | 9406862 | 3/1994 | |
| WO | 9607691 | 3/1996 | |
| WO | 2004046220 | 6/2004 | |
| WO | 2004099331 | 11/2004 | |
| WO | 2005121190 | 12/2005 | |
| WO | 2007100329 | 9/2007 | |
| WO | 2008077140 | 6/2008 | |
| WO | 2008077141 | 6/2008 | |
| WO | 2008092168 | 7/2008 | |
| WO | 2008124797 | 10/2008 | |
| WO | 2008130894 | 10/2008 | |
| WO | WO 2009086492 A1 * | 7/2009 | ................ C09J 4/00 |
| WO | 2009117729 | 9/2009 | |
| WO | 2010019832 | 2/2010 | |

OTHER PUBLICATIONS

Fouassier, "Photoinitiation, Photopolymerization, and Photocuring", Hanser/Gardner, pp. 276-283, 1995.

Olabisi et al, Handbook of Thermoplastics, Olabisi ed, Marcel Docker. Inc, NY, NY, p. 58, 1997.

* cited by examiner

CURABLE COMPOSITION WITH RUBBER-LIKE PROPERTIES

CROSS REFERENCE TO RELATED APPLICATIONS

This application claims the benefit of priority under 35 USC §119 of U.S. Provisional Application Ser. No. 61/381,927 filed Sep. 10, 2010, the entire disclosure of which is incorporated herein by reference.

FIELD OF INVENTION

The present invention relates to free-radically cured compositions, methods of preparation and uses thereof. More specifically, the present invention relates to ethylenically unsaturated functionalized compounds in combination with thiol derivatives and free-radically curable compositions thereof.

BACKGROUND OF INVENTION

Free-radically cured compositions are becoming more popular in many industries. The fast cure associated with these materials makes them attractive. There is a need in many industries to have materials that are very soft when cured (low modulus), have rubber-like properties (e.g. high elongation, are hydrophobic and are tough. Specifically, the properties are important to applications such as conformal coatings in the electronics industry, where encapsulation of sensitive electronic circuitry and protection from moisture and shock are crucial to the operation of electronic equipment. Optical fibers are very fragile and they need to be coated with very soft, rubbery materials to protect them from damage. It is usually desirable that seals and gaskets be made from materials that are to some degree yielding such that they are able to deform and tightly fill the space they are designed for, which may include slight irregularities. Golf ball covers are often radiation-cured, and today most of the materials being used in the manufacture of golf ball covers are very soft in order for the player to get more "feel" when striking the ball. Plastics are inherently very difficult to adhere other materials to and there are very few ways to adhere to plastics without some sort of pretreatment of the surface of the substrate. It has been found that low modulus materials often adhere better to plastics than harder, more rigid materials.

Silicones have fond a niche for many of the applications listed above, however, there is broad resistance to the continuing and/or expanded use of silicones in an industrial manufacturing environment due to environmental contamination associated with their manufacture and use. Furthermore, although silicones do posses very rubbery characteristics when cured, they often lack sufficient toughness for many applications. For at least these reasons there is a continuing need to find viable and less expensive replacement for silicones.

SUMMARY OF THE INVENTION

The present invention provides low viscosity curable adhesive compositions that include: at least one ethylenically unsaturated oligomer or polymer; at least one thiol functionalized compound; at least one reactive diluent; and at least one free-radical initiator. In certain embodiments, the viscosity of the composition is between about 100 cps and about 25,000 cps.

The ethylenically unsaturated oligomer or polymer can, in certain embodiments, be selected from the group consisting of a functionalized polyurethane, polyamide, polyurea, polycarbonate, polyester, polyether, polybutadiene, polyethylene, polypropylene and combinations thereof. When the ethylenically unsaturated oligomer or polymer is a functionalized polyurethane, it can have the structure according to formula I or according to formula II

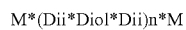

M*(Dii*Diol*Dii)n*M      I

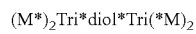

(M*)$_2$Tri*diol*Tri(*M)$_2$      II where each Dii is independently a diradical residue of a diisocyanate; each Tri is independently a triradical residue of a triisocyanate; each Diol is independently a diradical residue of a diol; each (*) indicates a linkage selected from the group consisting of —NH—CO—NH—, —COO— and —O—CO—NH—; n is an integer indicating the number of blocks of the polymer; and each M is an independently polymerizable ethylenically unsaturated radical of the structure M

E-(R)-(Q)-      M where each R and Q is independently selected from the group consisting of a substituted or an unsubstituted aliphatic, aryl and heteroaryl; and each E is independently selected from the group consisting of an acrylate, a methacrylate, maleimide, a styrenic, a vinyl ester, an olefin, allyl, vinyl ether, itaconate and fumarate. In certain aspects, the functionalized polyurethane is selected from the group consisting of

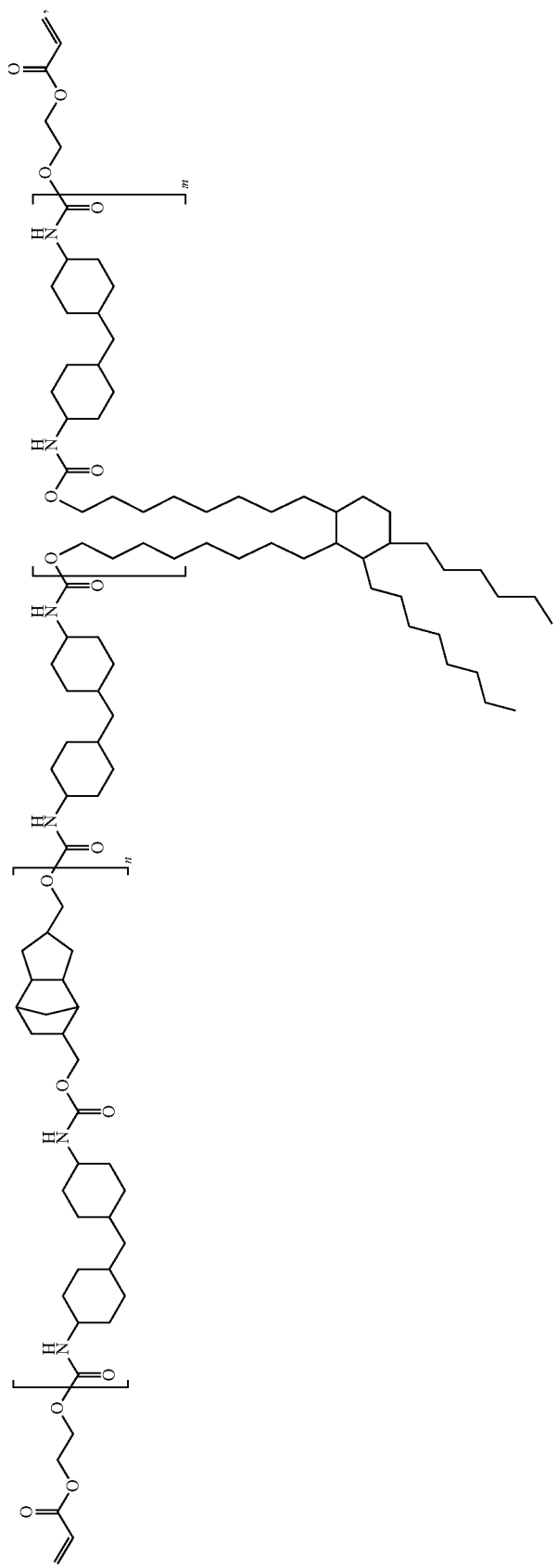

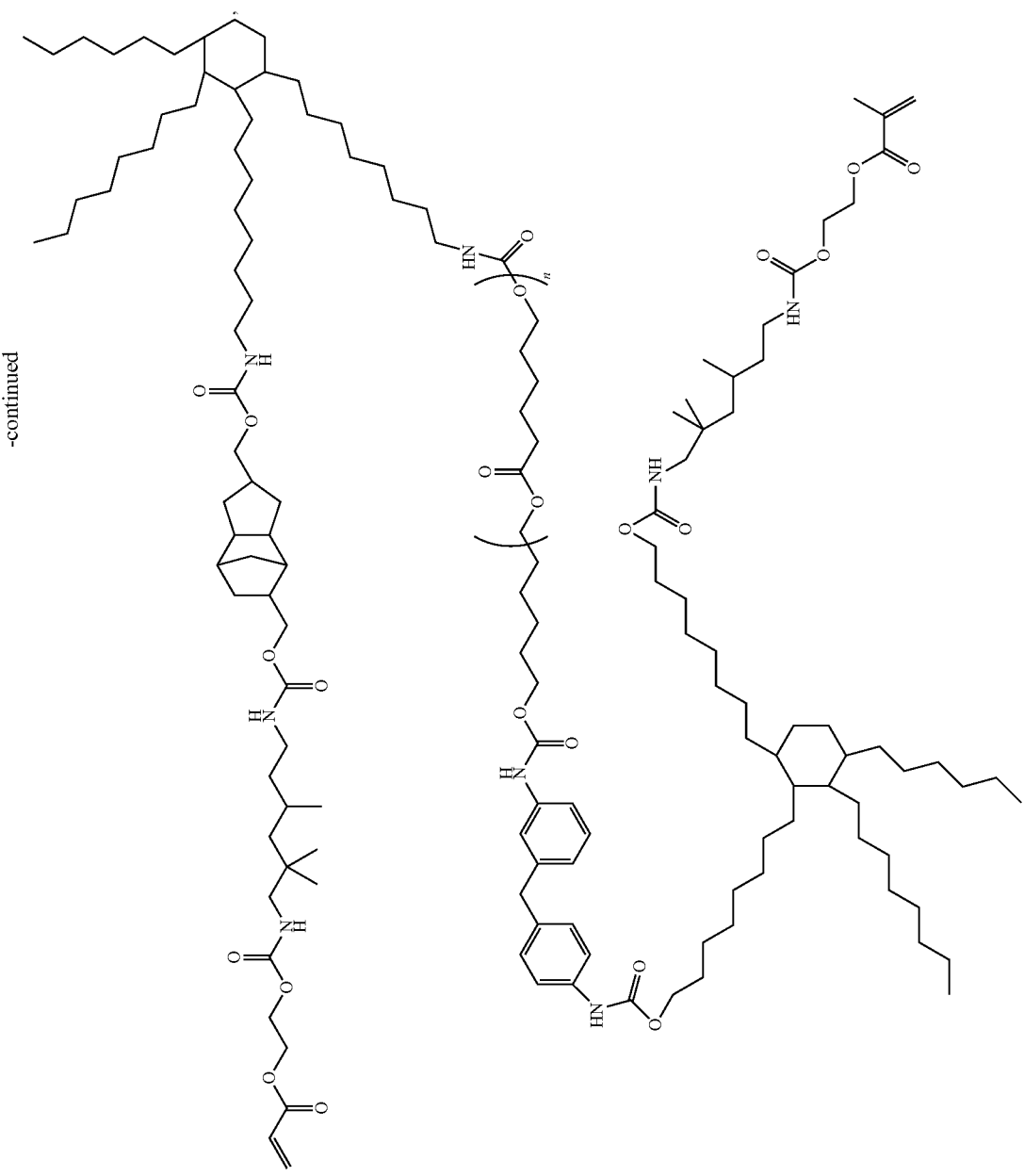

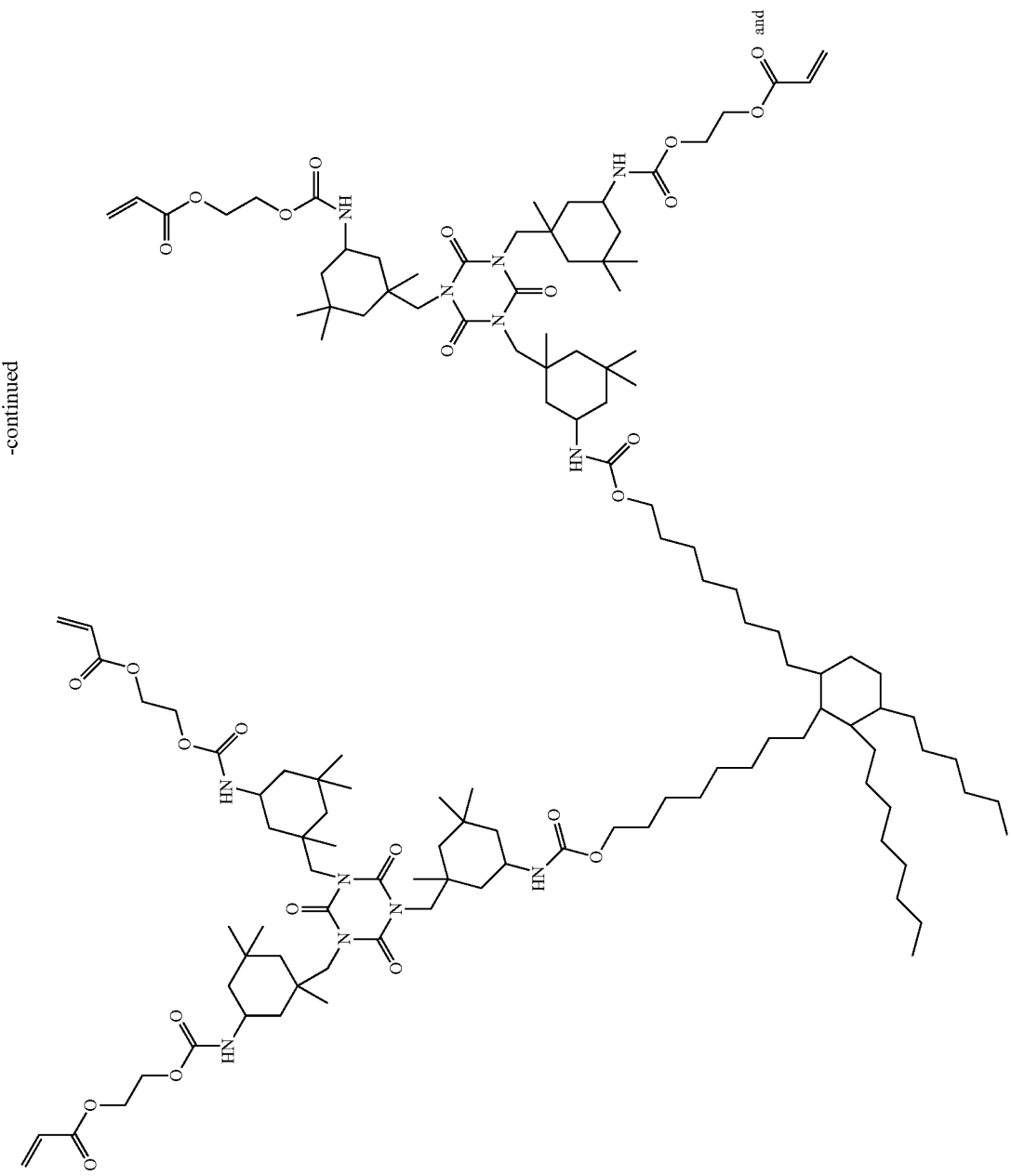
-continued
and

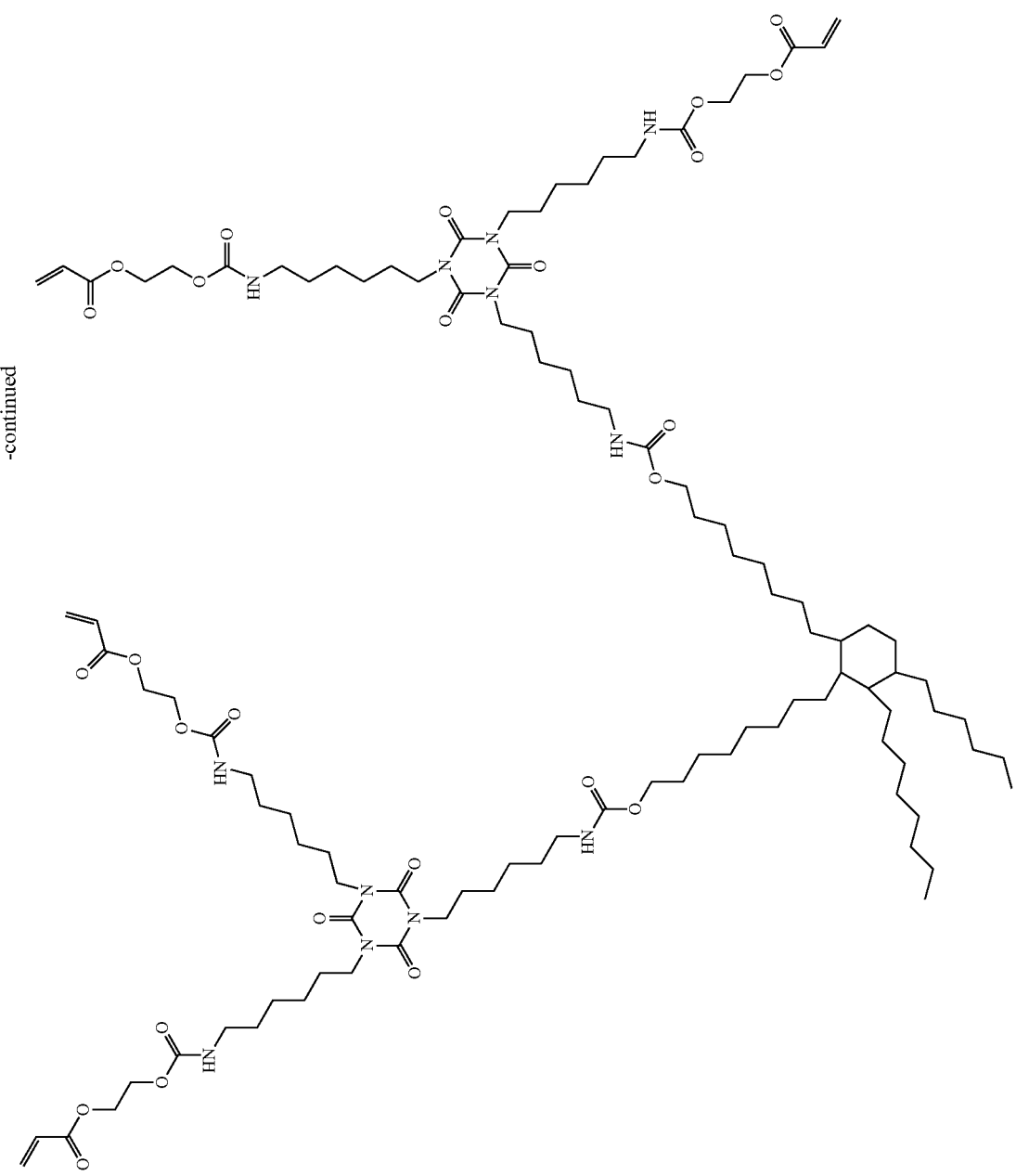

wherein each m and n is an integer having the value between 1 and 4.

In other embodiments, the ethylenically unsaturated oligomer or polymer is a (meth)acrylate functionalized hydrogenated polybutadiene. In yet further embodiments, the ethylenically unsaturated oligomer or polymer is:

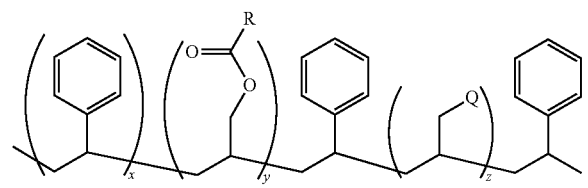

where R is selected from the group consisting of a substituted or an unsubstituted aliphatic, aryl and heterocyclic; Q is a polymerizable moiety independently selected from the group consisting of an acrylic acid ester, a methacrylic acid ester and a maleimido acid ester; and the sum of x, y and z is 100%, wherein x has the value between about 60% and 70% and the sum of y and z has the value between about 30% and about 40%.

In certain aspects of the invention, the ethylenically unsaturated oligomer or polymer comprises between about 2 and about 90 weight percent of the total weight of the composition. In such aspects, the composition can contain free radical initiators or photoinitiators (between about 0.1% and about 5% e.g. as weight percent of the total weight of the composition) and/or coupling agents and/or adhesion promoter (between about 0.1% and about 5% e.g. as weight percent of the total weight of the composition).

The thiol functionalized compound of the curable adhesive compositions of the invention compositions, which can be between about 2 and about 70 weight percent of the total weight of the composition in certain aspects, can be, in various embodiments, selected from the group consisting of 1,2-ethanedithiol, 1,3-propanedithiol, 2-mercaptoethyl ether, 2,3-butanediothiol, 2,2'-thiodiethanethiol, 1,5-pentanedithiol, benzene-1,3-dithiol, benzene-1,2-dithiol, 1,6-hexanedithiol, toluene-3,4-dithiol, 1,2-benzenedimethanethiol, 1,3-benzenedimethanethiol, 1,4-benzenedimethanethiol, 2,4,6-trimethyl-1,3-benzenedimethanethiol, biphenyl-4,4'-dithiol, 4,4'-dimercaptostilbene, 4,4'-bis(mercaptomethyl)biphenyl, trimethylolpropane tris(mercaptopropionate), 1,16-hexadecanedithiol and p-terphenyl-4,4'-dithiol.

Exemplary thiol functionalized compounds include, but are not limited to:

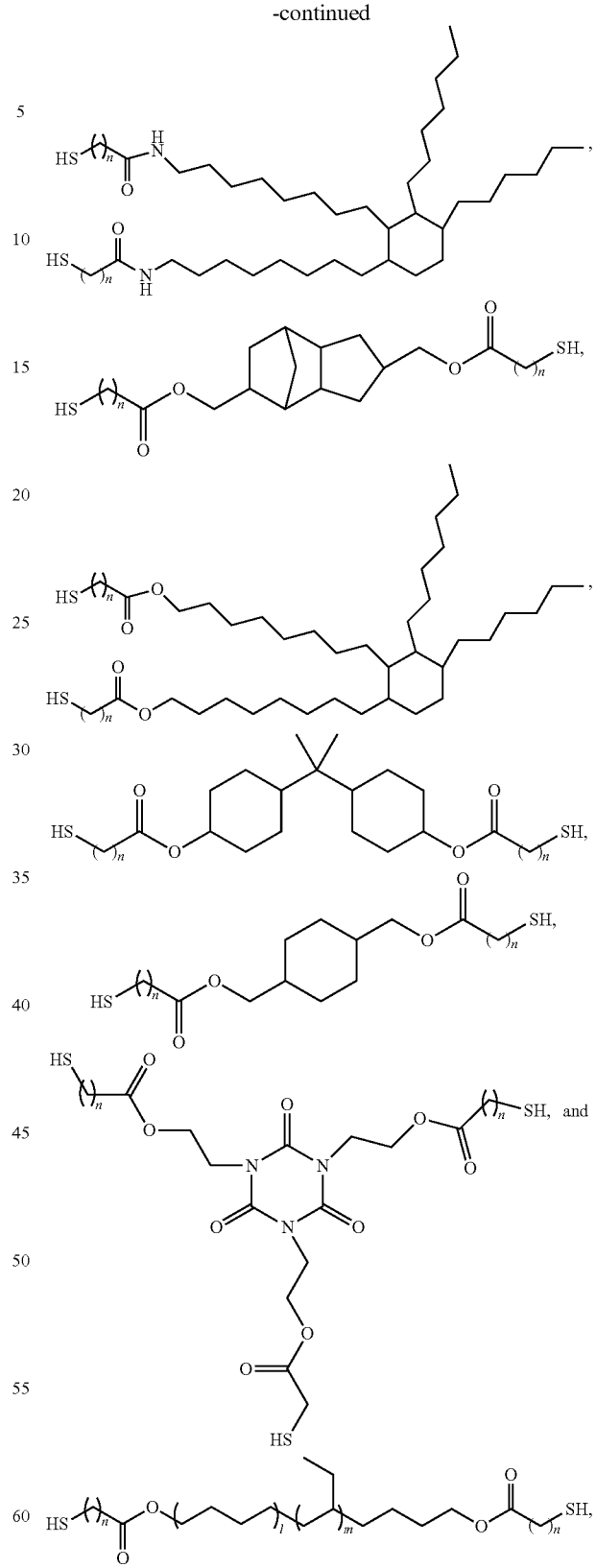

where n is an integer having the value of 1 or 2 and m is an integer having the value between 1 and about 1,000.

Embodiments of the invention include adhesive composition that, when cured, exhibit at least 30% elongation and/or have tensile adhesion to plastics such as polyamide, polyurethane, acrylic, Teflon® (polytetrafluoroethylene), polyvinyl chloride, polystyrene, polypropylene, and polyethylene and engineering plastics (e.g., acrylonitrile butadiene styrene, polycarbonate, polybutylene terephthalate, polyethylene terephthalate, polyphenylene oxide, polysulphone, polyetherketone, polyetheretherketone, polyimides, polyphenylene sulfide, and polyoxymethylene) of at least 75 psi.

In certain aspects of the invention, the reactive diluent comprises between about 1 wt % and about 50 wt % based on the total weight of the composition.

DETAILED DESCRIPTION

It is to be understood that both the foregoing general description and the following detailed description are exemplary and explanatory only and are not restrictive of the invention claimed. As used herein, the use of the singular includes the plural unless specifically stated otherwise. As used herein, "or" means "and/or" unless stated otherwise. Furthermore, use of the term "including" as well as other forms, such as "includes," and "included," is not limiting. The section headings used herein are for organizational purposes only and are not to be construed as limiting the subject matter described.

Unless specific definitions are provided, the nomenclatures utilized in connection with, and the laboratory procedures and techniques of analytical chemistry, synthetic organic and inorganic chemistry described herein are those known in the art, such as those set forth in "IUPAC Compendium of Chemical Terminology: IUPAC Recommendations (The Gold Book)" (McNaught ed.; International Union of Pure and Applied Chemistry, $2^{nd}$ Ed., 1997) and "Compendium of Polymer Terminology and Nomenclature: IUPAC Recommendations 2008" (Jones et al., eds; International Union of Pure and Applied Chemistry, 2009). Standard chemical symbols are used interchangeably with the full names represented by such symbols. Thus, for example, the terms "hydrogen" and "H" are understood to have identical meaning Standard techniques may be used for chemical syntheses, chemical analyses, and formulation.

DEFINITIONS

"About" as used herein means that a number referred to as "about" comprises the recited number plus or minus 1-10% of that recited number. For example, "about" 100 degrees can mean 95-105 degrees or as few as 99-101 degrees depending on the situation. Whenever it appears herein, a numerical range such as "1 to 20" refers to each integer in the given range; for example and without limitation to a specific range content, "1 to 20 carbon atoms" means that an alkyl or other group can contain only 1 carbon atom, 2 carbon atoms, 3 carbon atoms, etc., up to and including 20 carbon atoms (although the term "alkyl" also includes instances where no numerical range of carbon atoms is designated).

"Adhesive" or "adhesive compound" as used herein, refers to any substance that can adhere or bond two items together. Implicit in the definition of an "adhesive composition" or "adhesive formulation" is the fact that the composition or formulation is a combination or mixture of more than one species, component or compound, which can include adhesive monomers, oligomers, and/or polymers along with other materials, whereas an "adhesive compound" refers to a single species, such as an adhesive polymer or oligomer.

"Adhesive composition" as used herein, refers to un-cured mixtures in which the individual components in the mixture retain the chemical and physical characteristics of the original individual components of which the mixture is made. Adhesive compositions are typically malleable and may be liquids, paste, gel or another form that can be applied to an item so that it can be bonded to another item.

"Cured adhesive," "cured adhesive composition" or "cured adhesive compound" refer to adhesives components and mixtures obtained from reactive curable original compound(s) or mixture(s) thereof which have undergone a chemical and/or physical changes such that the original compound(s) or mixture(s) is (are) transformed into a solid, substantially non-flowing material. A typical curing process may involve crosslinking.

"Curable" means that an original compound(s) or composition material(s) can be transformed into a solid, substantially non-flowing material by means of chemical reaction, crosslinking, radiation crosslinking, or the like. Thus, adhesive compositions of the invention are curable, but unless otherwise specified, the original compound(s) or composition material(s) is (are) not cured.

"Photoimageable", as used herein, refers to the ability of a compound or composition to be selectively cured only in areas exposed to light. The exposed areas of the compound are thereby rendered cured and insoluble, while the unexposed area of the compound or composition remain un-cured and therefore soluble in a specific "developer" solvent. Typically, this operation is conducted using ultraviolet light as the light source and a photomask as the means to define where the exposure occurs. The selective patterning of dielectric layers on a silicon wafer can be carried out in accordance with various photolithographic techniques known in the art. In one method, a photosensitive polymer film ("photoresist") is applied over the desired substrate surface and dried. A photomask containing the desired patterning information is then placed in close proximity to the photoresist film. The photoresist is irradiated through the overlying photomask by one of several types of imaging radiation including UV light, e-beam electrons, x-rays, or ion beam. Upon exposure to the radiation, the photoresist polymer film undergoes a chemical change (crosslinks) with concomitant changes in solubility. After irradiation, the substrate is soaked in a developer solution that selectively removes the non-crosslinked or unexposed areas of the film.

"Wafer thinning" as used herein, refers to the process of removing materials from the backside of an unprocessed or unpolished face of a silicon wafer. Silicon wafers are often fabricated thicker than necessary in order to allow the user to trim the material to the desired thickness and also to give the manufacturer easier tolerances to deal with at the fabricating stage. Silicon is the most common semiconductor material on which thinning is performed, although the process can also be applied to other compound semiconductors, such as for example gallium arsenide and indium phosphide. The most popular method of wafer thinning involves the spin-coating of a UV-curable adhesive onto a wafer, followed by the UV-curing of a temporary adhesive on to the silicon wafer. The entire assembly is then mounted on a machine that grinds the backside of the wafer to the desired thickness often as thin as 20-50 µm, using a polishing wheel. After thinning, the bonded wafer stack is processed through standard semiconductor processes that may involve temperatures as high as 250-300° C., and various chemical rinses. The final step is the removal of the temporary adhesive to reveal the thinned and processed wafer.

"Image display device" as used herein, refers to a liquid crystal display (LCD) device as used, for example, in a cellular phone, television or computer monitor. An image display device typically includes a protecting transparent member made of plastic or glass disposed on a liquid crystal display panel. The gap between the LCD panel and the protecting member must be filled with a UV-curable resin that possesses very low shrinkage upon cure, very low modulus, is clear, hydrophobic, and has a very low dielectric constant.

"Conformal coatings" as used herein, refers to a material applied to electronic circuitry to act as protection against moisture, dust, chemicals, and temperature extremes, where uncoated electronic circuitry could be susceptible to damage or failure of the electronics to function properly. Typically, the electronic circuitry is coated with a layer of transparent conformal coating to protect the electronics from harsh environmental conditions. Furthermore, a suitably chosen coating material should reduce the effects of mechanical stress and vibration on the circuit and its ability to cope in extreme temperatures. For example, in a chip-on-board assembly process, a silicon die is mounted on the board with adhesive or a soldering process, and then electrically connected by wire bonding. To protect the very delicate package, the whole thing is encapsulated in a conformal coating called a "glob top."

"Passivation" as used herein, refers to the process of making a material "passive" in relation to another material or condition. "Passivation layers" are commonly used to encapsulate semiconductor devices, such as semiconductor wafers, to isolate the device from its immediate environment and, thereby, to protect the device from oxygen, water, etc., as well airborne or space-borne contaminants, particulates, humidity and the like. Passivation layers are typically formed from inert materials that are used to coat the device. This encapsulation process also passivates semiconductor devices by terminating dangling bonds created during manufacturing processes and by adjusting the surface potential to either reduce or increase the surface leakage current associated with these devices.

In certain embodiments of the invention, passivation layers (PLs) contain dielectric material that is disposed over a microelectronic device. Such PLs are typically patterned to form openings therein that provide for making electrical contact to the microelectronic device. Often a passivation layer is the last dielectric material disposed over a device and serves as a protective layer.

"Interlayer Dielectric Layer" or "ILD" refers to a layer of dielectric material disposed over a first pattern of conductive traces and between such first pattern and a second pattern of conductive traces. Such ILD layer is typically patterned to form openings therethrough (generally referred to as "vias") to provide for electrical contact between the first and second patterns of conductive traces in specific regions. Other regions of such ILD layers are devoid of vias and thus prevent electrical contact between the conductive traces of the first and second patterns in such other regions.

"Thermoplastic," as used herein, refers to the ability of a compound, composition or other material (e.g. a plastic) to dissolve in a suitable solvent or to melt to a liquid when heated and freeze to a solid, often brittle and glassy, state when cooled sufficiently.

"Thermoset," as used herein, refers to the ability of a compound, composition or other material to irreversibly "cure" resulting in a single three-dimensional network that has greater strength and less solubility compared to the non-cured product. Thermoset materials are typically polymers that may be cured, for example, through heat (e.g. above 200° Celsius), via a chemical reaction (e.g. epoxy ring-opening, free-radical polymerization, etc or through irradiation (e.g. visible light, UV light, electron beam radiation, ion-beam radiation, or X-ray irradiation).

Thermoset materials, such as thermoset polymers or resins, are typically liquid or malleable forms prior to curing, and therefore may be molded or shaped into their final form, and/or used as adhesives. Curing transforms the thermoset resin into a rigid infusible and insoluble solid or rubber by a cross-linking process. Thus, energy and/or catalysts are typically added that cause the molecular chains to react at chemically active sites (unsaturated or epoxy sites, for example), linking the polymer chains into a rigid, 3-D structure. The cross-linking process forms molecules with a higher molecular weight and resultant higher melting point. During the reaction, when the molecular weight of the polymer has increased to a point such that the melting point is higher than the surrounding ambient temperature, the polymer becomes a solid material.

"Cross-linking," as used herein, refers to the attachment of two or more oligomer or longer polymer chains by bridges of an element, a molecular group, a compound, or another oligomer or polymer. Crosslinking may take place upon heating or exposure to light; some crosslinking processes may also occur at room temperature or a lower temperature. As crosslinking density is increased, the properties of a material can be changed from thermoplastic to thermosetting.

As used herein, "B-stageable" refers to the properties of an adhesive having a first solid phase followed by a tacky rubbery stage at elevated temperature, followed by yet another solid phase at an even higher temperature. The transition from the tacky rubbery stage to the second solid phase is thermosetting. However, prior to thermosetting, the material behaves similarly to a thermoplastic material. Thus, such adhesives allow for low lamination temperatures while providing high thermal stability.

A "die" or "semiconductor die" as used herein, refers to a small block of semiconducting material, on which a functional circuit is fabricated.

A "flip-chip" semiconductor device is one in which a semiconductor die is directly mounted to a wiring substrate, such as a ceramic or an organic printed circuit board. Conductive terminals on the semiconductor die, usually in the form of solder bumps, are directly physically and electrically connected to the wiring pattern on the substrate without use of wire bonds, tape-automated bonding (TAB), or the like. Because the conductive solder bumps making connections to the substrate are on the active surface of the die or chip, the die is mounted in a face-down manner, thus the name "flip-chip."

"Underfill," "underfill composition" and "underfill material" are used interchangeably to refer to a material, typically polymeric compositions, used to fill gaps between a semiconductor component, such as a semiconductor die, and a substrate. "Underfilling" refers to the process of applying an underfill composition to a semiconductor component-substrate interface, thereby filling the gaps between the component and the substrate.

The term "monomer" refers to a molecule that can undergo polymerization or copolymerization thereby contributing constitutional units to the essential structure of a macromolecule (a polymer).

"Polymer" and "polymer compound" are used interchangeably herein, to refer generally to the combined the products of a single chemical polymerization reaction. Polymers are produced by combining monomer subunits into a covalently bonded chain. Polymers that contain only a single type of monomer are known as "homopolymers," while polymers containing a mixture of monomers are known as "copolymers."

The term "copolymers" is inclusive of products that are obtained by copolymerization of two monomer species, those obtained from three monomers species (terpolymers), those obtained from four monomers species (quaterpolymers), etc. It is well known in the art that copolymers synthesized by chemical methods include, but are not limited to, molecules with the following types of monomer arrangements:

"alternating copolymers", which contain regularly alternating monomer residues;

"periodic copolymers", which have monomer residue types arranged in a repeating sequence;

"random copolymers", which have a random sequence of monomer residue types;

"statistical copolymers", which have monomer residues arranged according to a known statistical rule;

"block copolymers", which have two or more homopolymer subunits linked by covalent bonds. The blocks of homopolymer within block copolymers, for example, can be of any length and can be blocks of uniform or variable length. Block copolymers with two or three distinct blocks are called diblock copolymers and triblock copolymers, respectively; and "star copolymers", which have chains of monomer residues having different constitutional or configurational features that are linked through a central moiety.

The skilled artisan will appreciate that a single copolymer molecule may have different regions along its length that can be characterized as an alternating, periodic, random, etc. A copolymer product of a chemical polymerization reaction may contain individual polymeric fragments that each differ in the arrangement of monomer units. The skilled artisan will further be knowledgeable in methods for synthesizing each of these types of copolymers, and for varying reaction conditions to favor one type over another.

Furthermore, the length of a polymer chain according to the present invention will typically vary over a range or average size produced by a particular reaction. The skilled artisan will be aware, for example, of methods for controlling the average length of a polymer chain produced in a given reaction and also of methods for size-selecting polymers after they have been synthesized.

Unless a more restrictive term is used, polymer is intended to encompass homopolymers, and copolymers having any arrangement of monomer subunits as well as copolymers containing individual molecules having more than one arrangement. With respect to length, unless otherwise indicated, any length limitations recited for the polymers described herein are to be considered averages of the lengths of the individual molecules in polymer.

"Thermoplastic elastomer" or "TPE", as used herein refers to a class of copolymers that consist of materials with both thermoplastic and elastomeric properties.

"Hard blocks" or "hard segments" as used herein refer to a block of a copolymer (typically a thermoplastic elastomer) that is hard at room temperature by virtue of a high melting point (Tm) or $T_g$. By contrast, "soft blocks" or "soft segments" have a $T_g$ below room temperature.

As used herein, "oligomer" or "oligomeric" refers to a polymer having a finite and moderate number of repeating monomers structural units. Oligomers of the invention typically have 2 to about 100 repeating monomer units; frequently 2 to about 30 repeating monomer units; and often 2 to about 10 repeating monomer units; and usually have a molecular weight up to about 3,000.

The skilled artisan will appreciate that oligomers and polymers may, depending on the availability of polymerizable groups or side chains, subsequently be incorporated as monomers in further polymerization or crosslinking reactions.

"Tackifier" as used herein, refers to chemical compounds used in formulating adhesives to increase the "tack", which is the stickiness of the surface of the adhesive. They are usually low-molecular weight compounds with high glass transition temperature. At low strain rate, they provide higher stress compliance, and become stiffer at higher strain rate. The higher glass transition temperature of these materials provides the adhesive with suitable viscoelastic properties.

As used herein, "aliphatic" refers to any alkyl, alkenyl, cycloalkyl, or cycloalkenyl moiety.

"Aromatic hydrocarbon" or "aromatic" as used herein refer to compounds having one or more benzene rings.

"Alkane," as used herein, refers to saturated straight-chain, branched or cyclic hydrocarbons having only single bonds. Alkanes have general formula $C_nH_{2n+2}$. "Cycloalkane," refers to an alkane having one or more rings in its structure.

As used herein, "alkyl" refers to straight or branched chain hydrocarbyl groups having from 1 up to about 500 carbon atoms. "Lower alkyl" refers generally to alkyl groups having 1 to 6 carbon atoms. The terms "alkyl" and "substituted alkyl" include, respectively, substituted and unsubstituted $C_1$-$C_{500}$ straight chain saturated aliphatic hydrocarbon groups, substituted and unsubstituted $C_2$-$C_{200}$ straight chain unsaturated aliphatic hydrocarbon groups, substituted and unsubstituted $C_4$-$C_{100}$ branched saturated aliphatic hydrocarbon groups, substituted and unsubstituted $C_1$-$C_{500}$ branched unsaturated aliphatic hydrocarbon groups.

For example, the definition of "alkyl" includes but is not limited to: methyl (Me), ethyl (Et), propyl (Pr), butyl (Bu), pentyl, hexyl, heptyl, octyl, nonyl, decyl, undecyl, ethenyl, propenyl, butenyl, penentyl, hexenyl, heptenyl, octenyl, nonenyl, decenyl, undecenyl, isopropyl (i-Pr), isobutyl (i-Bu), tert-butyl (t-Bu), sec-butyl (s-Bu), isopentyl, neopentyl, cyclopropyl, cyclobutyl, cyclopentyl, cyclohexyl, cycloheptyl, cyclooctyl, cyclopentenyl, cyclohexenyl, cycloheptenyl, cyclooctenyl, methylcyclopropyl, ethylcyclohexenyl, butenylcyclopentyl, tricyclodecyl, adamantyl, norbornyl and the like.

"Substituted alkyl" refers to alkyl moieties bearing substituents that include but are not limited to an alkyl, an alkenyl, an alkynyl, hydroxy, oxo, an alkoxy, mercapto, a cycloalkyl, a substituted cycloalkyl, a heterocyclic, a substituted heterocyclic, an aryl, a substituted aryl (e.g., aryl$C_{1-10}$alkyl or aryl$C_{1-10}$alkyloxy), a heteroaryl, a substituted heteroaryl (e.g., heteroaryl$C_{1-10}$alkyl), an aryloxy, a substituted an aryloxy, a halogen, a haloalkyl (e.g., trihalomethyl), cyano, nitro, nitrone, an amino, an amido, carbamoyl, $=O$, $=CH-$, $-C(O)H$, $-C(O)O-$, $-C(O)-$, $-S-$, $-S(O)_2-$, $-OC(O)-O-$, $-NR-C(O)-$, $-NR-C(O)-NR-$, $-OC(O)-NR-$, where R is H or a lower alkyl, acyl, oxyacyl, carboxyl, carbamate, sulfonyl, sulfonamide, sulfuryl, $C_{1-10}$alkylthio, aryl$C_{1-10}$alkylthio, $C_{1-10}$alkylamino, aryl$C_{1-10}$alkylamino, N-aryl-N—$C_{1-10}$alkylamino, $C_{1-10}$alkyl carbonyl, aryl$C_{1-10}$alkylcarbonyl, $C_{1-10}$alkylcarboxy, aryl $C_{1-10}$alkylcarboxy, $C_{1-10}$alkyl carbonylamino, aryl $C_{1-10}$alkylcarbonylamino, tetrahydrofuryl, morpholinyl, piperazinyl, and hydroxypyronyl.

As used herein, "cycloalkyl" refers to cyclic ring-containing groups containing in the range of about 3 up to about 20 carbon atoms, typically 3 to about 15 carbon atoms. In certain embodiments, cycloalkyl groups have in the range of about 4 up to about 12 carbon atoms, and in yet further embodiments, cycloalkyl groups have in the range of about 5 up to about 8 carbon atoms, and "substituted cycloalkyl" refers to cycloalkyl groups further bearing one or more substituents as set forth below.

As used herein, the term "aryl" represents an unsubstituted, mono-, di- or trisubstituted monocyclic, polycyclic, biaryl aromatic groups covalently attached at any ring position capable of forming a stable covalent bond, certain preferred points of attachment being apparent to those skilled in the art (e.g., 3-phenyl, 4-naphtyl and the like). The aryl substituents are independently selected from the group consisting of halo, —OH, —SH, —CN, —NO$_2$, trihalomethyl, hydroxypyronyl, $C_{1-10}$alkyl, aryl$C_{1-10}$alkyl, $C_{1-10}$alkyloxy$C_{1-10}$alkyl, aryl $C_{1-10}$alkyloxy$C_{1-10}$alkyl, $C_{1-10}$alkylthio$C_{1-10}$alkyl, aryl$C_{1-10}$alkylthio$C_{1-10}$alkyl, $C_{1-10}$alkylamino$C_{1-10}$alkyl, aryl$C_{1-10}$alkylamino$C_{1-10}$alkyl, N-aryl-N—$C_{1-10}$alkylamino$C_{1-10}$alkyl, $C_{1-10}$alkylcarbonyl$C_{1-10}$alkyl, aryl $C_{1-10}$alkylcarbonyl $C_{1-10}$alkyl, $C_{1-10}$alkylcarboxy$C_{1-10}$alkyl, aryl$C_{1-10}$alkylcarboxy$C_{1-10}$alkyl, $C_{1-10}$alkylcarbonylamino$C_{1-10}$alkyl, and aryl$C_{1-10}$alkylcarbonylamino$C_{1-10}$alkyl.

Some specific examples of moieties encompassed by the definition of "aryl" include but are not limited to phenyl, biphenyl, naphthyl, dihydronaphthyl, tetrahydronaphthyl, indenyl, indanyl, azulenyl, anthryl, phenanthryl, fluorenyl, pyrenyl and the like. "Substituted aryl" refers to aryl groups further bearing one or more substituents as set forth below.

As used herein, "hetero" refers to groups or moieties containing one or more heteroatoms such as N, O, Si and S. Thus, for example "heterocyclic" refers to cyclic (i.e., ring-containing) groups having e.g. N, O, Si or S as part of the ring structure, and having in the range of 3 up to 14 carbon atoms. "Heteroaryl" and "heteroalkyl" moieties are aryl and alkyl groups, respectively, containing e.g. N, O, Si or S as part of their structure. The terms "heteroaryl", "heterocycle" or "heterocyclic" refer to a monovalent unsaturated group having a single ring or multiple condensed rings, from 1 to 8 carbon atoms and from 1 to 4 hetero atoms selected from nitrogen, sulfur or oxygen within the ring.

The definition of heteroaryl includes but is not limited to thienyl, benzothienyl, isobenzothienyl, 2,3-dihydrobenzothienyl, furyl, pyranyl, benzofuranyl, isobenzofuranyl, 2,3-dihydrobenzofuranyl, pyrrolyl, pyrrolyl-2,5-dione, 3-pyrrolinyl, indolyl, isoindolyl, 3H-indolyl, indolinyl, indolizinyl, indazolyl, phthalimidyl (or isoindoly-1,3-dione), imidazolyl, 2H-imidazolinyl, benzimidazolyl, pyridyl, pyrazinyl, pyradazinyl, pyrimidinyl, triazinyl, quinolyl, isoquinolyl, 4H-quinolizinyl, cinnolinyl, phthalazinyl, quinazolinyl, quinoxalinyl, 1,8-naphthyridinyl, pteridinyl, carbazolyl, acridinyl, phenazinyl, phenothiazinyl, phenoxazinyl, chromanyl, benzodioxolyl, piperonyl, purinyl, pyrazolyl, triazolyl, tetrazolyl, thiazolyl, isothiazolyl, benzthiazolyl, oxazolyl, isoxazolyl, benzoxazolyl, oxadiazolyl, thiadiazolyl, pyrrolidinyl-2,5-dione, imidazolidinyl-2,4-dione, 2-thioxo-imidazolidinyl-4-one, imidazolidinyl-2,4-dithione, thiazolidinyl-2,4-dione, 4-thioxo-thiazolidinyl-2-one, piperazinyl-2,5-dione, tetrahydro-pyridazinyl-3,6-dione, 1,2-dihydro-[1,2,4,5]tetrazinyl-3,6-dione, [1,2,4,5]tetrazinanyl-3,6-dione, dihydro-pyrimidinyl-2,4-dione, pyrimidinyl-2,4,6-trione, 1H-pyrimidinyl-2,4-dione, 5-iodo-1H-pyrimidinyl-2,4-dione, 5-chloro-1H-pyrimidinyl-2,4-dione, 5-methyl-1H-pyrimidinyl-2,4-dione, 5-isopropyl-1H-pyrimidinyl-2,4-dione, 5-propynyl-1 H-pyrimidinyl-2,4-dione, 5-trifluoromethyl-1H-pyrimidinyl-2,4-dione, 6-amino-9H-purinyl, 2-amino-9H-purinyl, 4-amino-1H-pyrimidinyl-2-one, 4-amino-5-fluoro-1H-pyrimidinyl-2-one, 4-amino-5-methyl-1H-pyrimidinyl-2-one, 2-amino-1,9-dihydro-purinyl-6-one, 1,9-dihydro-purinyl-6-one, 1H-[1,2,4]triazolyl-3-carboxylic acid amide, 2,6-diamino-$N_6$-cyclopropyl-9H-purinyl, 2-amino-6-(4-methoxyphenylsulfanyl)-9H-purinyl, 5,6-dichloro-1H-benzoimidazolyl, 2-isopropylamino-5,6-dichloro-1H-benzoimidazolyl, 2-bromo-5,6-dichloro-1H-benzoimidazolyl, and the like. Furthermore, the term "saturated heterocyclic" represents an unsubstituted, mono-, di- or trisubstituted monocyclic, polycyclic saturated heterocyclic group covalently attached at any ring position capable of forming a stable covalent bond, certain preferred points of attachment being apparent to those skilled in the art (e.g., 1-piperidinyl, 4-piperazinyl and the like).

Hetero-containing groups may also be substituted. For example, "substituted heterocyclic" refers to a ring-containing group having in the range of 3 up to 14 carbon atoms that contains one or more heteroatoms and also bears one or more substituents, as set forth above. Examples of substituents include, but are not limited to halo, —OH, —SH, —CN, —NO$_2$, trihalomethyl, hydroxypyronyl, $C_{1-10}$alkyl, aryl $C_{1-10}$alkyl, $C_{1-10}$alkyloxy$C_{1-10}$alkyl, aryl$C_{1-10}$alkyloxy$C_{1-10}$ alkyl, $C_{1-10}$alkylthio$C_{1-10}$alkyl, aryl$C_{1-10}$alkylthio$C_{1-10}$ alkyl, $C_{1-10}$alkylamino$C_{1-10}$alkyl, aryl$C_{1-10}$alkylamino $C_{1-10}$alkyl, N-aryl-N—$C_{1-10}$alkylamino$C_{1-10}$alkyl, $C_{1-10}$alkylcarbonyl$C_{1-10}$alkyl, aryl$C_{1-10}$alkylcarbonyl $C_{1-10}$alkyl, $C_{1-10}$alkylcarboxy$C_{1-10}$alkyl, aryl$C_{1-10}$alkylcarboxy$C_{1-10}$alkyl $C_{1-10}$alkylcarbonylamino$C_{1-10}$alkyl, and aryl$C_{1-10}$alkylcarbonylamino $C_{1-10}$alkyl.

As used herein, the term "phenol" includes compounds having one or more phenolic functions per molecule. The terms aliphatic, cycloaliphatic and aromatic, when used to describe phenols, refers to phenols to which aliphatic, cycloaliphatic and aromatic residues or combinations of these backbones are attached by direct bonding or ring fusion.

As used herein, "alkenyl," "alkene" or "olefin" refer to straight or branched chain unsaturated hydrocarbyl groups having at least one carbon-carbon double bond, and having in the range of about 2 up to 500 carbon atoms. In certain embodiments, alkenyl groups have in the range of about 5 up to about 250 carbon atoms, 5 up to about 100 carbon atoms, 5 up to about 50 carbon atoms or 5 up to about 25 carbon atoms. In other embodiments, alkenyl groups have in the range of about 6 up to about 500 carbon atoms, 8 up to about 500 carbon atoms, 10 up to about 500 carbon atoms or 20 up to about 500 carbon atoms or 50 up to about 500 carbon atoms. In yet further embodiments, alkenyl groups have in the range of about 6 up to about 100 carbon atoms, 10 up to about 100 carbon atoms, 20 up to about 100 carbon atoms or 50 up to about 100 carbon atoms, while in other embodiments, alkenyl groups have in the range of about 6 up to about 50 carbon atoms, 6 up to about 25 carbon atoms, 10 up to about 50 carbon atoms, or 10 up to about 25 carbon atoms. "Substituted alkenyl" refers to alkenyl groups further bearing one or more substituents as set forth above.

The term "ethylenically unsaturated" is used herein to refer to a moiety having a reactive C=C double bond, including those having a vinyl or an allyl group. Exemplary ethylenically unsaturated compounds include acrylates, methacrylates, styrenics, acrylamides, methacrylamides, maleimides, maleates, fumarates, itaconates, vinyl esters and vinyl ethers.

It will be understood that the term "reactive C=C double bond" is not intended to include the endocyclic conjugated double bonds in an aromatic rings since these bonds are known to be unreactive, e.g., to free radical polymerization under normal polymerization conditions.

The term "vinyl" as used herein refers to a moiety having the structure:

"Allyl" as used herein refers to a moiety having the structure:

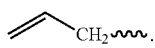

"Imide" as used herein, refers to a functional group having two carbonyl groups bound to a primary amine or ammonia. The general formula of an imide of the invention is:

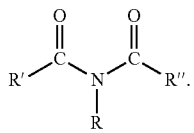

"Polyimides" are polymers of imide-containing monomers. Polyimides are typically linear or cyclic. Non-limiting examples of linear and cyclic (e.g. an aromatic heterocyclic polyimide) polyimides are shown below for illustrative purposes.

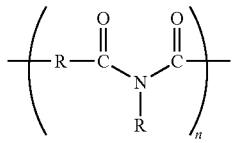
Linear Polyimide

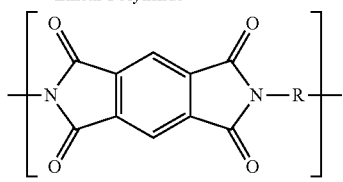
Aromatic Heterocyclic Polyimide

"Maleimide," as used herein, refers to an N-substituted maleimide having the formula as shown below:

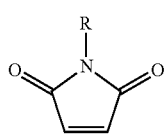

where R is an aromatic, heteroaromatic, aliphatic, or polymeric moiety.

"Bismaleimide" or "BMI", as used herein, refers to compound in which two imide moieties are linked by a bridge, i.e. a compound a polyimide having the general structure shown below:

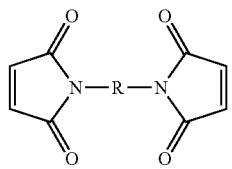

where R is an aromatic, heteroaromatic, aliphatic, or polymeric moiety.

BMIs can cure through an addition rather than a condensation reaction, thus avoiding problems resulting from the formation of volatiles. BMIs can be cured by a vinyl-type polymerization of a pre-polymer terminated with two maleimide groups.

As used herein, the term "acrylate" refers to a compound bearing at least one moiety having the structure:

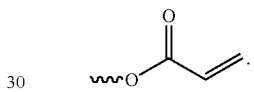

As used herein, the term "methacrylate" refers to a compound bearing at least one moiety having the structure:

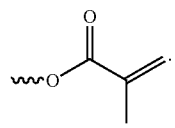

As used herein, the term "acrylamide" refers to a compound bearing at least one moiety having the structure:

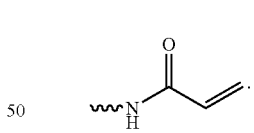

As used herein, the term "methacrylamide" refers to a compound bearing at least one moiety having the structure:

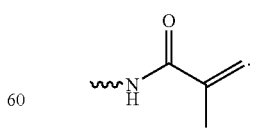

As used herein, the terms "halogen," "halide," or "halo" include fluorine, chlorine, bromine, and iodine.

As used herein, "epoxy" refers to divalent moieties having the structure:

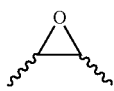

The term "epoxy" also refers to thermosetting epoxide polymers that cure by polymerization and crosslinking when mixed with a catalyzing agent or "hardener," also referred to as a "curing agent" or "curative." Epoxies of the present invention include, but are not limited to aliphatic, cycloaliphatic, glycidyl ether, glycidyl ester, glycidyl amine epoxies, and the like, and combinations thereof.

As used herein, the term "vinyl ether" refers to a compound bearing at least one moiety having the structure:

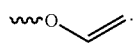

As used herein, the term "vinyl ester" refers to a compound bearing at least one moiety having the structure:

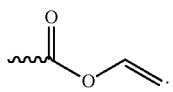

As used herein, "styrenic" or "styrene-derived" refers to a compound bearing at least one moiety having the structure:

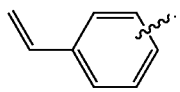

As used herein, "maleate" refers to a compound bearing at least one moiety having the structure:

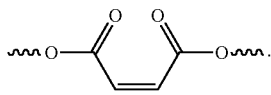

"Fumarate" as used herein, refers to a compound bearing at least one moiety having the structure:

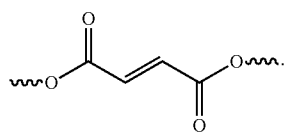

"Itaconate", as used herein refers to a compound bearing at least one moiety having the structure:

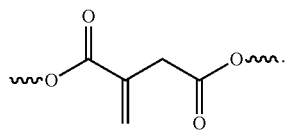

"Isocyanate" as used herein, refers to a compound bearing at least one moiety having the structure —N=C=O, while "diisocyanate" is defined as one kind of isocyanate, i.e., having two such groups —N=C=O.

"Polyurethane" as used herein refers to a polymer or oligomer composed of a chain of organic units joined by carbamate moieties —NH—C(O)—O—.

As used herein, the term "free radical initiator" refers to any chemical species which, upon exposure to sufficient energy (e.g., light, heat, or the like), decomposes into parts, which are uncharged, but every one of such part possesses at least one unpaired electron.

As used herein, the term "coupling agent" refers to chemical species that are capable of bonding to a mineral surface and which also contain polymerizably reactive functional group(s) so as to enable interaction with the adhesive composition. Coupling agents thus facilitate linkage of the die-attach paste to the substrate to which it is applied.

"Diamine" as used herein, refers generally to a compound or mixture of compounds, where each species has 2 amine groups.

A "diol" according to the present invention, is a compound containing two hydroxyl groups (—OH groups); while "polyol" refers to alcohols containing multiple hydroxyl groups.

The term "solvent," as used herein, refers to a liquid that dissolves a solid, liquid, or gaseous solute, resulting in a solution. "Co-solvent" refers to a second, third, etc. solvent used with a primary solvent.

"Glass transition temperature" or "$T_g$": is used herein to refer to the temperature at which an amorphous solid, such as a polymer, becomes brittle on cooling, or soft on heating. More specifically, it defines a pseudo second order phase transition in which a supercooled melt yields, on cooling, a glassy structure and properties similar to those of crystalline materials e.g. of an isotropic solid material.

"Modulus" or "Young's modulus" as used herein, is a measure of the stiffness of a material. Within the limits of elasticity, modulus is the ratio of the linear stress to the linear strain, which can be determined from the slope of a stress-strain curve created during tensile testing.

The "Coefficient of Thermal Expansion" or "CTE" is a term of art describing a thermodynamic property of a substance. The CTE relates a change in temperature to the change in a material's linear dimensions. As used herein "$\alpha_1$ CTE" or "$\alpha_1$" refers to the CTE before the $T_g$, while "$\alpha_2$ CTE" refers to the CTE after the $T_g$.

"Thixotropy" as used herein, refers to the property of a material which enables it to stiffen or thicken in a relatively short time upon standing, but upon agitation or manipulation to change to low-viscosity fluid; the longer the fluid undergoes shear stress, the lower its viscosity. Thixotropic materials are therefore gel-like at rest but fluid when agitated and have high static shear strength and low dynamic shear strength, at the same time.

"Thermogravimetric analysis" or "TGA" refers to a method of testing and analyzing a material to determine changes in weight of a sample that is being heated in relation to change in temperature. "Decomposition onset" refers to a temperature when the loss of weight in response to the increase of the temperature indicates that the sample is beginning to degrade.

In one embodiment, the present invention provides silicone replacements for some applications. In certain aspects, suitable replacement materials and formulations of the invention have fairly low viscosity before being cured, so that the material can be dispensed with ease. In certain other aspects, compositions of the invention contain one or more free-radical initiators or photoinitiators to allow the composition to be either thermally cured or UV-cured fairly rapidly. In yet another aspect, formulations of the invention are fairly hydrophobic to protect the substrate from moisture. Once cured, the materials often have very low modulus, high elongation, good tensile strength, good moisture resistance, good chemical resistance, and very good thermal resistance. For example, in some embodiments, adhesive compositions of the present invention exhibit least 30% elongation, when cured, and have tensile adhesion to plastics of at least 75 psi, when cured. Such plastics include polyamide, polyurethane, acrylic, Teflon® (polytetrafluoroethylene), polyvinyl chloride, polystyrene, polypropylene, and polyethylene and engineering plastics (e.g., acrylonitrile butadiene styrene, polycarbonate, polybutylene terephthalate, polyethylene terephthalate, polyphenylene oxide, polysulphone, polyetherketone, polyetheretherketone, polyimides, polyphenylene sulfide, and polyoxymethylene plastic).

According to embodiments of the present invention, certain ethylenically unsaturated functionalized compounds make them suitable for formulations and compositions of the invention. Polyurethane (meth)acrylates can be synthesized such that, when UV-cured, give very high tensile strength, good elongation and low modulus. Usually, however, in order to obtain high elongation (over 100%) the polyurethane (meth)acrylate must have a very high molecular weight, which often leads to a very high viscosity, thus making formulating difficult. The material can be thinned out by adding mono-functional diluents with the resulting composition retaining good tensile strength and higher elongation (100-200%). Nevertheless, additional steps must be taken to achieve significantly higher elongation. The same is true for other ethylenically unsaturated functionalized compounds such as polyesters, polyamides, polybutadienes, polyimides, polyethers, polystyrenes, polyethylenes, polypropylenes and such.

According to embodiments of the present invention, by adding certain amounts of thiol derivatives to the ethylenically unsaturated functionalized compounds described herein a tough material can be produced when cured. This material can be custom tailored to possess high elongation, high tensile strength, peel strength, thermal resistance, moisture resistance, chemical resistance and adhesion to a wide variety of substrates. Elongation well over 200% and up to 1000% in some formulations has been observed with such formulations, yet they still maintain tensile strength as good as or better than silicones with similar elongation.

The present invention is useful for many different applications: in some applications, a colorless non-yellowing materials is required, and in other applications this requirement is not essential. One skilled in the art understands that to obtain colorless, non-yellowing materials it is essential to have pure monomers, typically aliphatic or cycloaliphatic. In addition, the backbone of the polymer or oligomer should not contain any unsaturated, aromatic groups or ether linkages, as these tend to yellow over time with heat and light exposure.

Embodiments of the present invention employ thiol-ene chemistry. Thiol-ene chemistry typically involves the co-cure of polyfunctional thiol compounds with di- or polyfunctional vinyl compounds either with or without photoinitiators. This chemistry produces some materials with very good properties when cured; however, a cross-linked polymer will only be produced when monomers with a combined average functionality of greater than two are employed. Thus, the formulation cannot contain mono-functional compounds. Thiol-ene chemistry was also developed for vinyl derivatives, with high electron density. Even though acrylate functionality groups can be used in thiol-ene formulations, it has been reported that the more electron rich the vinyl group the faster the reaction will proceed. This chemistry has also been limited to a few thiol derivatives that are commercially available.

Accordingly, embodiments of the present invention provide low viscosity, curable (e.g., radically curable) adhesive compositions comprising at least one ethylenically unsaturated oligomer or polymer (such as at least one oligomer or polymer of either structure I or structure II shown below, or a combination of oligomer(s) or polymer(s) of both structure I and structure II), at least one thiol functionalized compound, at least one reactive diluent and at least one free-radical initiator. In some embodiments of the present invention, the adhesive compositions have viscosity within the range of between about 100 cps and about 25,000 cps.

The quantities of the compounds in the compositions of the present invention can vary and those having ordinary skill in the art will select specific amounts thereof that are necessary to achieve the optimum properties, such as viscosity. For example, according to some embodiments of the present invention, the compositions can contain between about 2 and about 90 weight percent the ethylenically unsaturated oligomer or polymer, between about 2 and about 70 weight percent the thiol functionalized compound, between about 0.1 and about 5 weight percent free radical initiators or photoinitiators, between about 1 and about 50 weight percent reactive diluent and, in addition, between about 0.1 and about 5 weight percent coupling agent or adhesion promoter, each of the total weight of the composition.

In general, the ethylenically unsaturated oligomer that can be used can be any of a functionalized polyurethane, polyamide, polyurea, polycarbonate, polyester, polyether, polybutadiene, polyethylene, polypropylene and combinations thereof. More specific description of ethylenically unsaturated oligomers, thiol functionalized compounds, reactive diluents and free-radical initiators that can be used follow below.

Ethylenically Unsaturated Functionalized Polyurethanes

Ethylenically unsaturated functionalized polyurethanes that can be used can be prepared synthetically by reacting an appropriate starting polyol with a suitable isocyanate using techniques known to those having ordinary skill in the art. The polyols that can be used for this purpose include, but are not limited to, dimer diol, polyesters of dimer diol (available from Croda International PLC of Snaith, England), hydroxyl terminated hydrogenated polybutadiene resins (Krasol® resins, Sartomer U.S.A., LLC, Exton, Pa.), tricyclodecane dimethanol, cyclohexane dimethanol, butanediol, polyols derived from caprolactone and the like.

The isocyanates useful for preparing ethylenically unsaturated functionalized polyurethanes include but are not limited to, trimethylhexamethylenediisocyanate (TMDI), toluenediisocyanate (TDI), methylenediphenylisocyanate (MDI), isophoronediisocyanate (IPDI), methylenedicyclohexyldiisocyanate ($H_{12}$MDI), m-xylylenediisocyanate (MXDI), Tolonate™ polyfunctional isocyanates (Perstorp Corp., Perstorp, Sweden) and the diisocyanate product DDI®1410 (Cognis Corp, Monheim, Germany). The molar ratio of the isocyanate to the polyol for the initial chain extension reaction can be between about 1.1 and about 3.0 depending on the combination of diisocyanate and polyol used. The reaction of the polyol with the isocyanate is typically conducted without solvent in order to reduce the impact on the environment, and thereby make a process as "green" as possible. No catalyst is used in the reaction, in order to minimize the side reactions and to get good thermal stability. The reaction is usually conducted at a temperature between about 90° C. and about 120° C. for 1-2 hours to complete the formation of the isocyanate-capped polyurethane. Once formed the intermediate is reacted with a functionalized alcohol to produce functionalized polyurethane.

The functional group is usually one that can be free-radically cured, such as hydroxyethyl acrylate, hydroxyethyl methacrylate, caprlolactone acrylate, hydroxypropyl methacrylate, hydroxypropyl acrylate, and hydroxybutyl methacrylate. Vinyl ether derivatives may also be used, including, for example, ethylene glycol monovinyl ether, diethylene glycol monovinyl ether, butane diol monovinyl ether, hexanediol monovinyl ether, and cyclohexane dimethanol monovinyl ether, all of which can also be incorporated into these functional oligomers. Other derivatives such as maleimide functionalized alcohols (e.g. hydroxyethyl maleimidocaproic acid ester) can also be included in the invention composition. Suitable polyurethanes include those that are capped with a mixture of acrylate and methacrylate, as well as mixtures of electron poor and electron rich ethylenically unsaturated compound.

Accordingly, in some embodiments, the ethylenically unsaturated functionalized polyurethane component of the above-described composition obtained as discussed above is defined by a bifunctional compound of structural formula I or by a polyfunctional compound of structural formula II or by a combination that includes compounds of both structural formula I and structural formula II:

$$M^*(Dii^*Diol^*Dii)_n{}^*M \quad \text{I}$$ 

$$(M^*)_2 Tri^* Diol^* Tri(^*M)_2, \quad \text{II}$$ 

where each Dii is independently a diradical residue of a diisocyanate, each Tri is independently a triradical residue of a triisocyanate, each Diol is independently a diradical residue of a diol, each (*) indicates a linkage selected from —NH—CO—NH—, —COO— and —O—CO—NH—, n is an integer indicating the number of blocks of the polymer and each M is an independently polymerizable ethylenically unsaturated radical of the formula $$E\text{-}(R)\text{-}(Q)\text{-}, \quad M$$ 

where each R and Q is independently a substituted or an unsubstituted aliphatic, aryl or heteroaryl and each E is independently an acrylate, a methacrylate, maleimide, a styrenic (i.e., a styrene-derived group), a vinyl ester, an olefin, allyl, vinyl ether, itaconate or fumarate.

As stated above, in some embodiments, the use of a bifunctional polyurethane of formula I is contemplated. As can be seen from formula I, such bifunctional products of the invention contain diisocyanate radicals. The diisocyanate radicals Dii that can be used in the ethylenically unsaturated functionalized bifunctional polyurethane component of structural formula I, above, include, but are not limited to, any of 1,3-bis (isocyanatomethyl)cyclohexane, 1,3-phenylene diisocyanate, 1,4-diisocyanatobutane, 1,5-diisocyanato-2-methylpentane, 1,8-diisocyanatooctane, 1,-chloromethyl-2, 4-diisocyanatobenzene, 2,4,6-trimethyl-1,3-phenylene diisocyanate, 4,4'-methylenebis(2,6-diethylphenyl isocyanate), 4,4'-methylenebis(cyclohexyl isocyanate), 4,4'-methylenebis (phenyl isocyanate), 4-chloro-6-methyl-1,3-phenylene diisocyanate, hexamethylene diisocyanate, tolylene-2,4-diisocyanate, tolylene-2,6-diisocyanate, isophorone diisocyanate, hexamethylene-1,6-diisocyanate, 2,2,4-trimethylhexane diisocyanate, m-xylene diisoycanate, 1,12-diisocyanatododecane, 1,3-bis(1-isocyanato-1-methylethyl)benzene, 1,4-cyhclohexylene diisocyanate and dimer acid diisocyanate.

In another embodiment of the invention, the use of a polyfunctional polyurethane component of structural formula II shown above is contemplated. The starting materials in the synthesis of these types of molecules is a hexamethylene diisocyante trimer and an isophorone diisocyanate trimer. These isocyanurate based trimers provide a very hydrolytically and thermally stable base to build from. In a typical procedure, one mole of the trimer (i.e., a product having 3 equivalents of isocyanate groups —N═C═O) is reacted with two equivalents of hydroxyethyl acrylate (neat), at a temperature between about 90° C. and about 120° C. After consumption of all of the alcohol, theoretically a mono-isocyanate remains. The addition of about ½ mole of a diol and further heating converts the remaining isocyanate to the urethane.

The triisocyanates contemplated for use in this invention include, but are not limited to, the homopolymer of hexamethylene diisocyante (Tolonate™ HDT-series, Perstorp), and the homopolymer of isophorone diisocyante (Tolonate™ IDT-series, Perstorp). One skilled in the art will appreciate that these trimers are derived from the catalytic homopolymerization of the diisocyantes and a wide variety of these molecules can be synthesized for use in the invention.

Some exemplary ethylenically unsaturated functionalized bifunctional polyurethanes of structural formula I, above, that can be used in the compositions according to embodiments of the invention are the following:

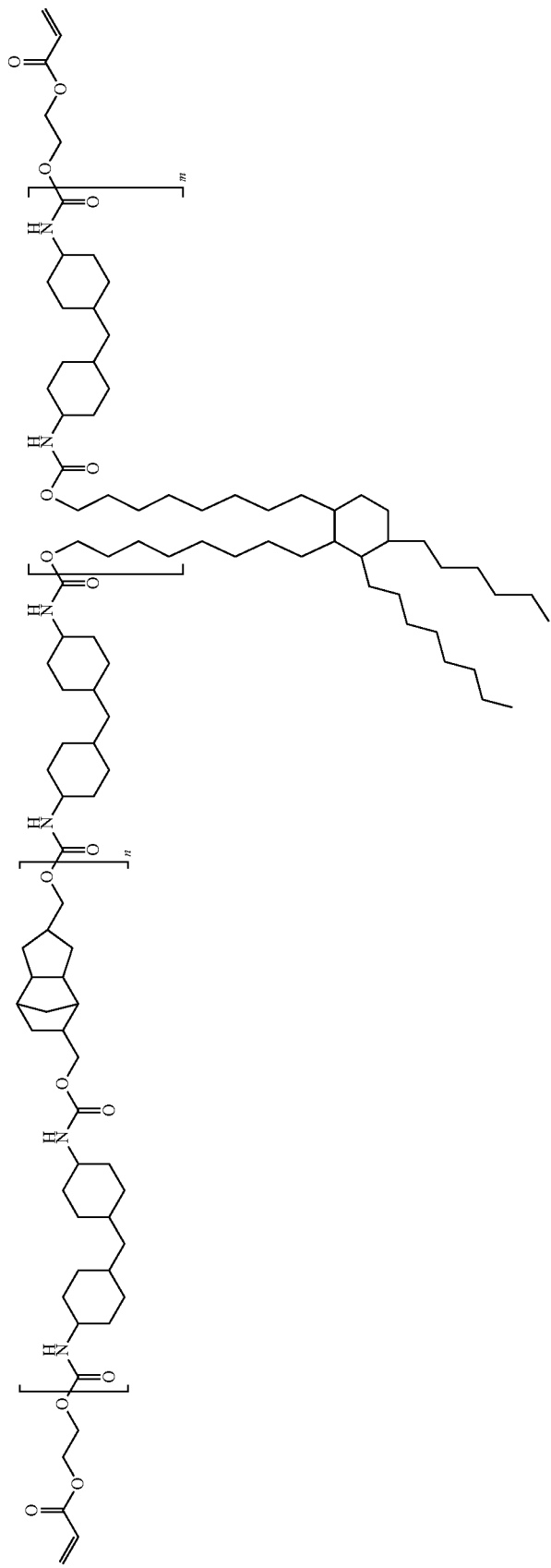

where each m and n is an integer having the value between 1 and 4; and
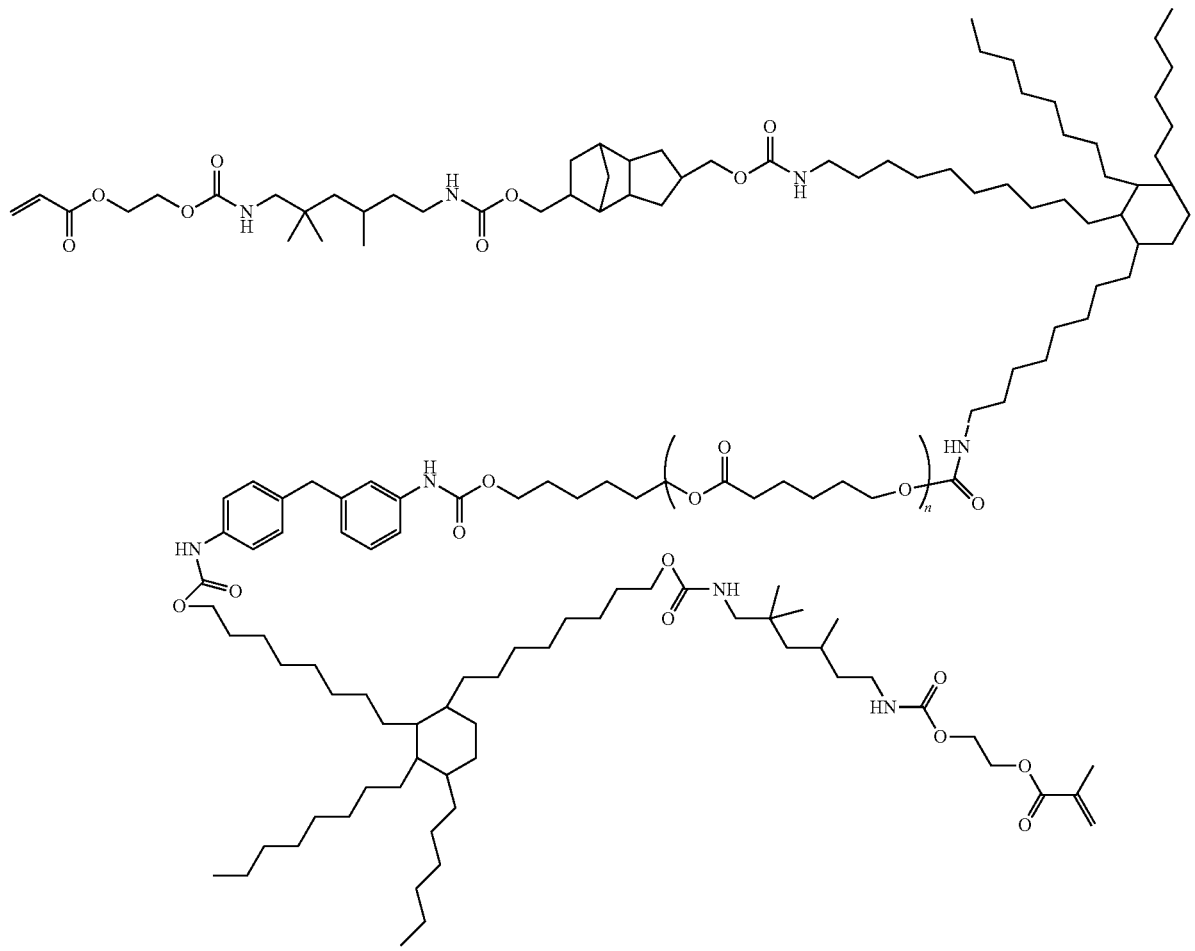
Exemplary polyfunctional polyurethanes of structural formula II, above, that can be used in the compositions according to embodiments of the invention are the following:
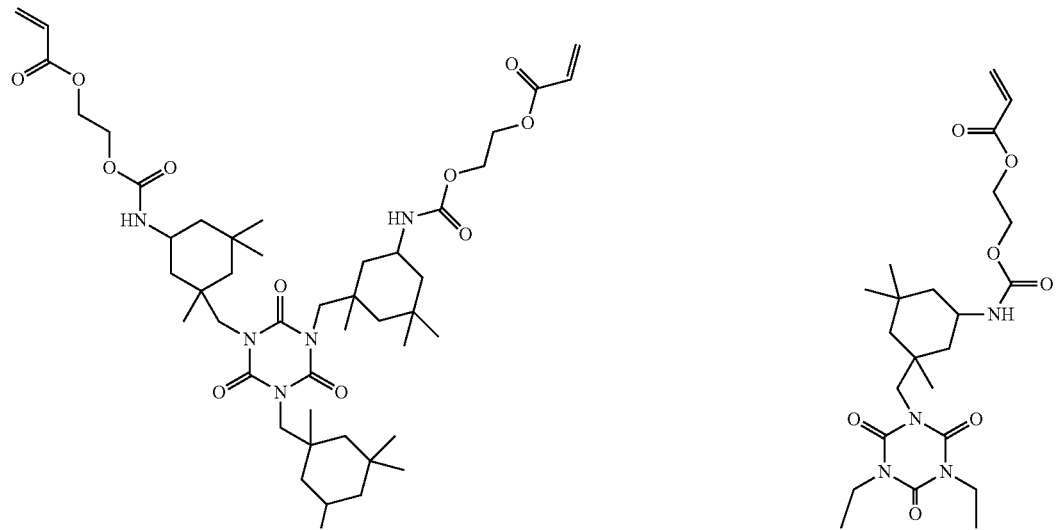

-continued

33

34

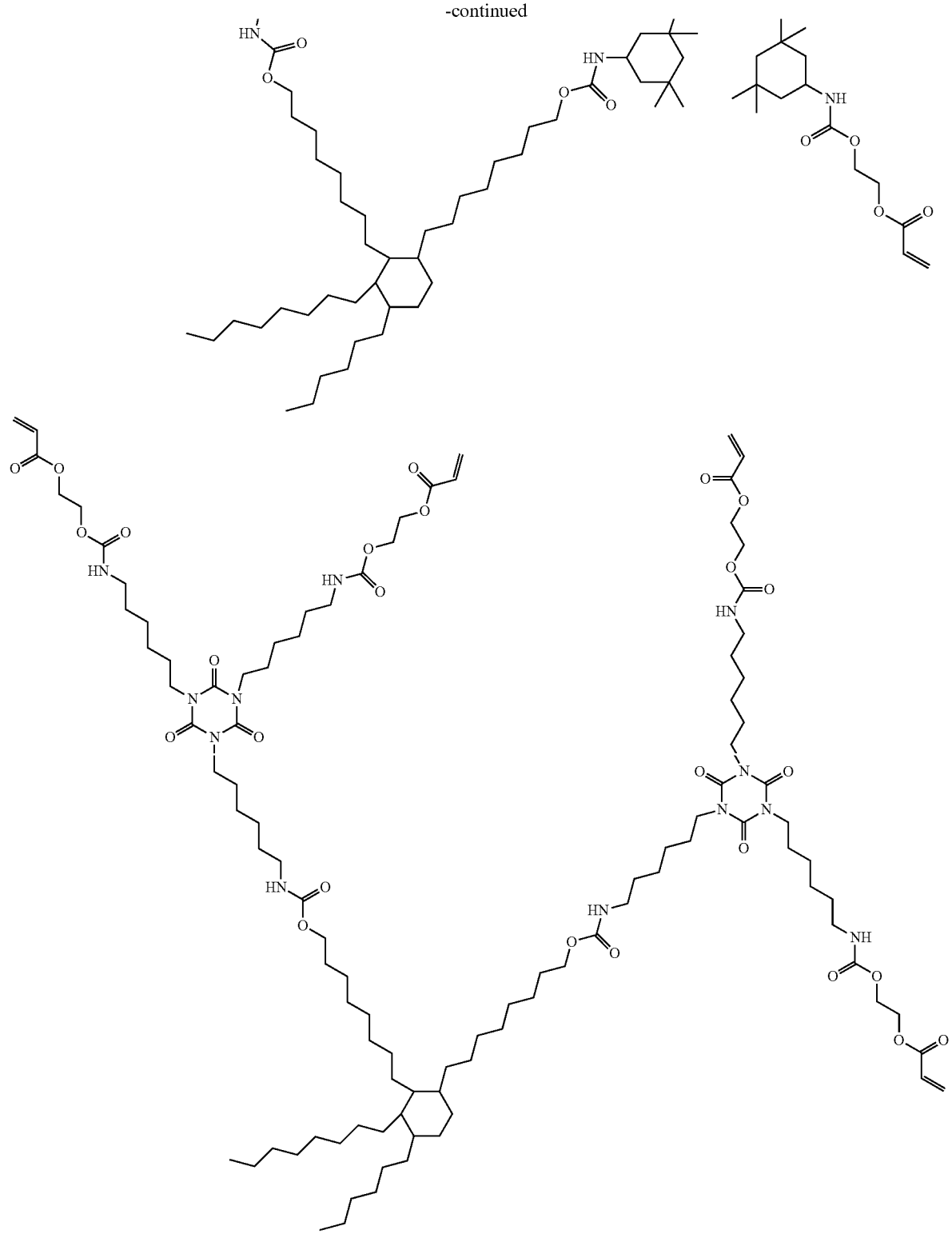

Thiol Derivatives

Many of the di- and polythiol compounds contemplated for use in the invention compositions are commercially available, such as 1,2-ethanedithiol, 1,3-propanedithil, 2-mercaptoethyl ether, 2,3-butanediothiol, 2,2'-thiodiethanethiol, 1,5-pentanedithiol, benzene-1,3-dithiol, benzene-1,2-dithiol, 1,6-hexanedithiol, toluene-3,4-dithiol, 1,2-benzenedimethanethiol, 1,3-benzenedimethanethiol, 1,4-benzenedimethanethiol, 2,4,6-trimethyl-1,3-benzenedimethanethiol, biphenyl-4,4'-dithiol, 4,4'-dimercaptostilbene, 4,4'-bis(mercaptomethyl)biphenyl, trimethylolpropane tris(mercaptopropionate), 1,16-hexadecanedithiol, p-terphenyl-4,4'-dithiol. Many other di- and polythiol derivatives can be synthesized in the laboratory to provide a wider and perhaps better, range of properties. Such compounds include but are not limited to the following exemplary thiol amides and esters:

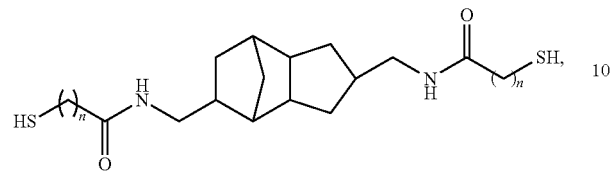

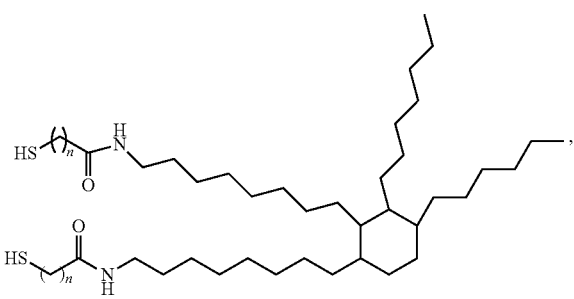

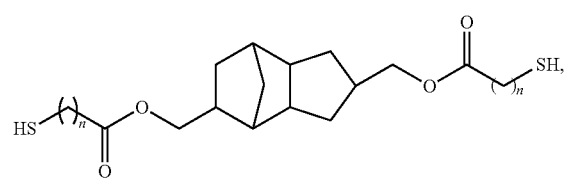

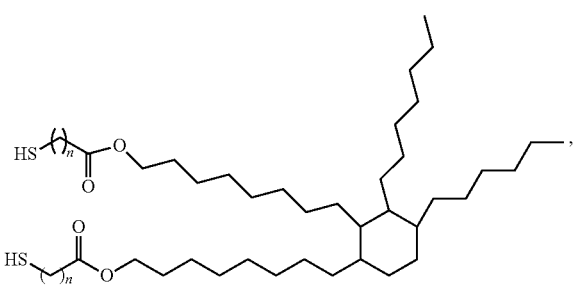

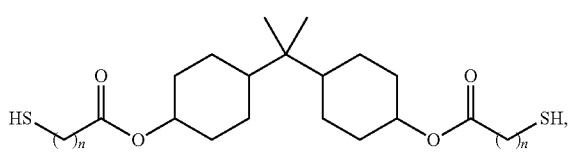

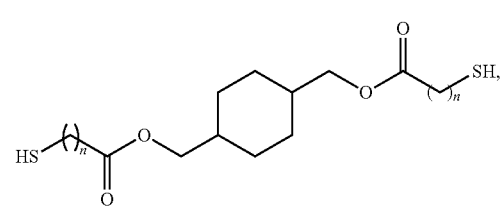

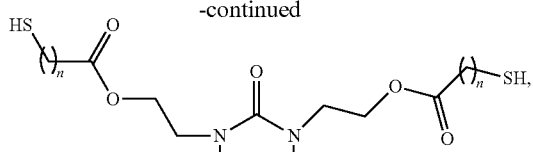

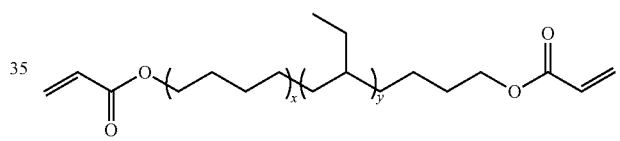

where n is an integer having the value of 1 or 2 and m is an integer having the value between 1 and about 1,000.

Additional Reactants

In some embodiments of the invention, certain additional reactants can be included. In some embodiments of the invention, a rubbery clear hydrophobic molecule may be required; an example of such a molecule is the following.

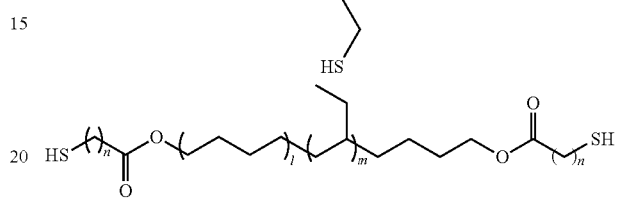

The hydroxyl terminated hydrogenated polybutadiene materials are commercially available (Krasol® resins, Cray Valley), and sold in molecular weights of 2,000 and 3,000. These resins are converted to the diacrylated product via the acid catalyzed reaction with acrylic acid. The acrylated products are clear, colorless liquids that are ideal for applications where a soft, low modulus, hydrophobic, fast curing resin with a low dielectric constant is required.

In another embodiment of the invention, a material with a higher glass transition temperature is often required, which is a so-called "tackifier; an example of such a molecule is the following.

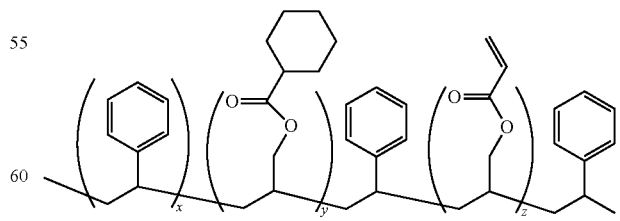

The styrene-allyl alcohol copolymers are commercially available materials and come in several grades. The mole ratio of styrene to allyl alcohol is typically between about 60:40 and about 70:30, respectively, i.e., the sum of x, y and z is 100%, wherein x has the value between about 60% and 70% and the sum of y and z has the value between about 30% and about 40%.

The conversion of all of the alcohol groups to acrylates would produce a very highly cross-linked stiff polymer upon curing; this may not be desirable, especially if the object is to produce materials with high elongation. The conversion of a small amount (10-30%) of the alcohol groups to an acrylate, and the majority of the alcohol groups to a cyclohexyl ester will allow the molecule to retain some of the very good mechanical properties, without the high cross-link density. The reaction is conducted via the acid catalyzed condensation of the starting material with cyclohexyl carboxylic acid and acrylic acid. The material appears to be a glassy amorphous glassy solid after workup.

As discussed above, the alcohol groups of polystyrene-co-allyl alcohol were reacted with cyclohexane carboxylic acid and acrylic acid. Other carboxylic acids can be also used. Examples of such carboxylic acids the use of which is also contemplated include, but are not limited to, methacrylic acid, maleimidoacids, formic acid, acetic acid, propionic acid, butyric acid, caproic acid, pentanoic acid, benzoic acid, t-butylbenzoic acid, long chain fatty acids, oleic acid, palmitic acid and combinations thereof.

The above exemplified tackifier is a suitable base oligomer as well as tackifier. Other similar resins the use of which is also contemplated include, but are not limited to, polystyrene-co-maleic anhydride resins, polypropylene-co-maleic anhydride resins, polyethylene-co-maleic anhydride resins, resins and their derivatives, terpenes and modified terpenes, aliphatic, cycloaliphatic (C5 resins), aromatic resins (C9 resins), aliphatic/aromatic resins (C5/C9 resins), hydrogenated hydrocarbon resins, and their mixtures, and terpene-phenol resins (TPR).

The reactive diluents that can be used according to embodiments of this invention include many mono-, di-, and polyfunctional ethylenically unsaturated functionalized compounds. Many of these compounds are commercially available through various chemical catalogs. Many others are synthesized as needed for a specific function in the formula. It is known to those skilled in the art that for UV-cure electron poor compounds such as acrylate functionalized compounds are preferred due to their fast cure. It has also been found that better properties may be achieved, such as better adhesion and better tensile strength, when the cure is conducted at a slower pace in the oven by thermally curing the formulation. If the cure is conducted thermally, it is the ethylenically unsaturated compounds are typically functionalized with a combination of electron rich and electron poor substituents, for example, a combination of methacrylate functionalized resin with an acrylate functionalized resin, or a vinyl ether functionalized resin in combination with a maleimide functionalized resin. This typically leads to a polymer with improved properties.

The difunctional and polyfunctional (meth)acrylate reactive diluents diluents that can be used according to embodiments of this invention include, but are not limited to, 1,12-dodecanediol di(meth)acrylate, 1,3-butylene glycol di(meth)acrylate, 1,4-butanediol di(meth)acrylate, 1,6-hexanediol di(meth)acrylate, alkoxylated hexanediol di(meth)acrylate, cyclohexane dimethanol di(meth)acrylate, diethylene glycol di(meth)acrylate, dipropylene glycol di(meth)acrylate, ethoxylated bisphenol-A di(meth)acrylate, polyester di(meth)acrylate, polyethylene glycol di(meth)acrylate, polypropylene glycol di(meth)acrylate, tetraethylene glycol di(meth)acrylate, tricyclodecane dimethanol di(meth)acrylate, dimer diol di(meth)acrylate, ethoxylated trimethylolpropane tri(meth)acrylate, pentaerythritol tri(meth)acrylate, propoxylated glyceryl tri(meth)acrylate, tris(2-hydroxy ethyl) isocyanurate tri(meth)acrylate and pentaerythritol tetra (meth)acrylate.

The monofunctional (meth)acrylate reactive diluents diluents that can be used according to embodiments of this invention include, but are not limited to, 2(2-ethoxyethoxy)ethyl (meth)acrylate, 2-phenoxyethyl (meth)acrylate, 3,3,5-trimethylcyclohexyl (meth)acrylate, alkoxylated lauryl (meth)acrylate, alkoxylated phenol (meth)acrylate, caprolactone (meth)acrylate, dicyclopentadienyl (meth)acrylate, diethylene glycol methyl ether (meth)acrylate, ethoxylated nonylphenol (meth)acrylate, isobornyl (meth)acrylate, isodecyl (meth)acrylate, isooctyl (meth)acrylate, lauryl (meth)acrylate, octyldecyl (meth)acrylate, stearyl (meth)acrylate, tetrahydrofurfuryl (meth)acrylate and tridecyl (meth)acrylate.

The present invention provides compositions containing at least one compound according to formula I or II, above. For example, the compounds may be used independently as the monomer in a polymeric composition, such as an adhesive composition, or may be combined with other materials and reagents to prepare adhesive compositions. In certain embodiments, the compound may be combined with other adhesives and/or resins to prepare adhesive compositions. A compound of the invention may be used as the sole thermoset/monomer of an adhesive composition of the invention. In other embodiments, the compounds of the invention may be combined with other monomers, such as thermoset monomers, to make a fully formulated adhesive composition.

In certain embodiments of the invention, compound according to formula I and/or II is present in a composition, such as an adhesive composition, in an amount between about 0.5 weight percent (wt %) and about 98 wt %, based on the total weight of the composition. Typically, the composition will contain an amount of the compound equal to at least about 5 wt %, often at least about 10 wt %, frequently at least about 20 wt % and in some embodiments at least about 40 wt %, based on the total weight of the composition.

In another embodiment of the invention, the composition containing the compound of formula I and/or II includes at least one co-monomer, which is typically present in an amount between about 10 wt % and about 90 wt %, based on the total weight of the composition. In some aspects of the invention, the composition will contain an amount of the co-monomer equal to at least about 15 wt %, often at least about 20 wt %, frequently at least about 25 wt %, and in some embodiments at least about 30 wt % based on the total weight of the composition. Co-monomers suitable for use in the compound I and/or II-containing compositions according to the invention include, but are not limited to, acrylates, acrylamides, methacrylates, methacrylamides, cyanate esters, maleimides, vinyl ethers, vinyl esters, styrenic compounds, allyl functional compounds, epoxies, epoxy curatives, and olefins.

Curing Initiators.

In certain embodiments, the present invention provides compositions, such as adhesive compositions, including at least one compound of formula I and/or II and at least one curing initiator. The curing initiator is typically present in adhesive compositions of the invention at an amount between about 0.1 wt % and about 5 wt %, based on total weight of the composition, and is typically a free-radical initiator. In some embodiments, the curing initiator is present at least about 0.5 wt %, often at least about 1 wt %, frequently at least about 2 wt %, at in some embodiments at least about 3 wt %, based on total weight of the composition.

Free-radical initiators contemplated for use in the practice of the present invention typically decompose (i.e., have a half life in the range of about 10 hours) at temperatures in the range of between about 70° C. and about 180° C. Exemplary free radical initiators contemplated for use in the practice of the present invention include peroxides (e.g. dicumyl peroxide, dibenzoyl peroxide, 2-butanone peroxide, tert-butyl perbenzoate, di-tert-butyl peroxide, 2,5-bis(tert-butylperoxy)-2, 5-dimethylhexane, bis(tert-butyl peroxyisopropyl)benzene, and tert-butyl hydroperoxide), azo compounds (e.g., 2,2'-azobis(2-methyl-propanenitrile), 2,2'-azobis(2-methylbutanenitrile), and 1,1'-azobis(cyclohexanecarbonitrile)). Other free-radical initiators that will be well known in the art may also be suitable for use in the compositions of the present invention.

Photoinitiators.

Free radical initiators also include photoinitiators. For invention compositions that contain a photoinitiator, the curing process can be initiated, for example, by UV radiation. In one embodiment, the photoinitiator is present at a concentration of 0.1 wt % to 5 wt %, based on the total weight of the organic compounds in the composition (excluding any filler). In one embodiment, the photoinitiator comprises 0.5 wt % to 3.0 wt %, based on the total weight of the organic compounds in the composition. In other embodiments, the photoinitiator is present at least about 0.5 wt %, often at least about 1 wt %, frequently at least about 2 wt %, and in some embodiments at least about 3 wt %, based on the total weight of the organic compounds in the composition. Photoinitiators include benzoin derivatives, benzilketals, α,α-dialkoxyacetophenones, α-hydroxyalkylphenones, α-aminoalkylphenones, acylphosphine oxides, titanocene compounds, combinations of benzophenones and amines or Michler's ketone, and the like.

In some embodiments, both photoinitiation and thermal initiation may be desirable. For example, curing of a photoinitiator-containing adhesive can be started by UV irradiation, and in a later processing step, curing can be completed by the application of heat to accomplish a free-radical cure. Both UV and thermal initiators may therefore be added to the adhesive compositions of the invention, Anionic Catalysts.

In other embodiments the initiator is an anionic catalyst. Examples of anionic initiators include Lewis bases such as tertiary amines and imidazoles. Specific examples include benzyldimethlamine, triethylamine, tripropylamine, pyridine, dimethylaminopyridine, dimethylethanolamine, diethylethanolamine, tributylamine, 2-methylimidazole, 2-undecylimidazole, 1-benzyl-2-methylimidazole, 1-cyanoethyl-2-methylimidazole, 1-cyanoethyl-2-phenylimidazole, 1-cyanoethyl-2-undecylimidazole, 1-cyanoethyl-2-ethyl-4-methylimidazole, 1-cyanoethyl-2-isopropylimidazole, 1-cyanoethyl-2-methylimidazole-trimellitate, 1-cyanoethyl-2-phenylimidazole-trimellitate, 1-cyanoethyl-2-ethyl-4-methylimidazole-trimellitate, 1-cyanoethyl-2-undecylimidazole-trimellitate, 2,4-diamino-6-(2' methylimidazolyl-(1')) ethyl-s-triazine, 2,4-diamino-6-(2'-ethyl-4'-methylimidazolyl-(1'))ethyl-s-triazine, 2,4-diamino-6-(2'-undecylimidazolyl-(1'))ethyl-s-triazine, 2-phenyl-4-methyl-5-hydroxymethylimidazole, 2-phenyl-4,5-dihydroxymethylimidazole, 1-cyanoethyl-2-phenyl-4,5-di(cyanoethoxymethyl)imidazole, 2-methylimidazole-isocyanuric acid addition compound, 2-phenylimidazole-isocyanuric acid addition compound, 2,4-diamino-6[2'-methylimidazolyl-(1)']ethyl-s-triazine isocyanurate adduct, 4,4'-methylene-bis-(2-ethyl-5-methylimidazole), and the like.

Cationic Catalysts.

In other embodiments the initiator is a cationic catalyst. Specific examples include onium compounds. Specific examples include bis[4-(diphenylsulphonio)-phenyl]sulphide bis-hexafluorophosphate, bis[4-(di(2-hydroxyethyl) phenyl)sulphonio-phenyl]sulphide bis-hexafluorophosphate, bis[4-(di(4-(2-hydroxyethyl)phenyl)sulphonio)phenyl]sulphide bis-hexafluoroantimonate, ($\eta^5$-2,4-(cyclopentadienyl) [(1,2,3,4,5,6-$\eta$)-(methylethyl)-benzene]-iron(II) hexafluorophosphate, triarylsulphonium hexafluorophosphate, (tolylcumyl) iodonium tetrakis (pentafluorophenyl) borate, diaryl iodonium hexafluoroantimonate, and the like. In certain embodiments, the invention provides adhesive compositions including 0.5 wt % to about 98 wt % of at least one [compound] described herein, based on total weight of the composition; optionally, 10 wt % to about 90 wt % of at least one co-monomer selected from acrylates, methacrylates, maleimides, vinyl ethers, vinyl esters, styrenic compounds, allyl functional compounds, and olefins, based on total weight of the composition; 0 to about 90 wt % of a conductive filler; 0.1 wt % to about 5 wt % of at least one curing initiator, based on total weight of the composition; and 0.1 wt % to about 4 wt %, of at least one coupling agent, based on total weight of the composition.

Additional Co-Curing Compounds.

In certain aspects, the compositions of the invention include at least one additional compound that can co-cure with the compound of formula I and/or II. The additional compound is typically present in an adhesive composition between about 10 wt % and about 90 wt % based on total weight of the composition. In such aspects, the composition will typically contain an amount of the co-curing compound equal to at least about 20 wt %, often at least about 30 wt %, frequently at least about 40 wt %, and in some embodiments at least about 50 wt % based on the total weight of the composition.

Such compounds include, for example, epoxies (e.g. epoxies based on glydicyl ethers of alcohols, phenols, bisphenols, oligomeric phenolics, phenolic novolacs, cresolic novolacs, acrylates, methacrylates, maleimides, poly-phenol compounds (e.g. poly(4-hydroxystyrene)), anhydrides, dianhydrides, polyanhydrides such as styrene-maleic anhydride co-polymers, imides, carboxylic acids, dithiols, polythiols, phenol functional mono-maleimides, bismaleimides, polymaleimides, mono-itaconates, mono-maleates, mono-fumarates, acrylic acid, methacrylic acid, cyanate esters, vinyl ethers, vinyl esters, or phenol functional esters, ureas, amides, polyolefins (e.g. amine, carboxylic acid, hydroxy, and epoxy functional) siloxanes (e.g. epoxy, phenolic, carboxylic acid, or thiol functional), cyanoacrylates, allyl functional compounds and styrenic, as well as combinations thereof. In yet further embodiments, the invention provides cured adhesives prepared from compositions that include at least one compound according to formula I and/or II.

Coupling Agents.

In certain aspects, the adhesive compositions of the invention include at least one additional coupling agent. Exemplary coupling agents contemplated for use in the practice of the present invention include silicate esters, metal acrylate salts (e.g., aluminum methacrylate), titanates (e.g., titanium methacryloxyethylacetoacetate triisopropoxide), zirconates, or compounds that contain a copolymerizable group and a chelating ligand (e.g., phosphine, mercaptan, acetoacetate, and the like). In some embodiments, the coupling agent contains both a co-polymerizable function (e.g., vinyl, acrylate, methacrylate, epoxy, thiol, anhydride, isocyanate, and phenol moieties) and a silicate ester function. The silicate ester portion of the coupling agent is capable of condensing with metal hydroxides present on the mineral surface of substrate, while the co-polymerizable function is capable of co-polymerizing with the other reactive components of invention adhesive compositions, such as die-attach pastes. In certain embodiments coupling agents contemplated for use in the practice of the invention are oligomeric silicate coupling agents such as poly(methoxyvinylsiloxane).

Inhibitors for free-radical cure may also be added to the adhesive compositions and die-attach pastes described herein to extend the useful shelf life. Examples of free-radical inhibitors include hindered phenols such as 2,6-di-tert-butyl-4-methylphenol; 2,6-di-tert-butyl-4-methoxyphenol; tert-butyl hydroquinone; tetrakis(methylene(3,5-di-tert-butyl-4-hydroxyhydrocinnamate))benzene; 2,2'-methylenebis(6-tert-butyl-p-cresol); and 1,3,5-trimethyl-2,4,6-tris(3',5'-di-tert-butyl-4-hydroxybenzyl)benzene. There are other useful hydrogen-donating antioxidants such as derivatives of p-phenylenediamine and diphenylamine. It is also well know in the art that hydrogen-donating antioxidants may be synergistically combined with quinones and metal deactivators to make a very efficient inhibitor package. Examples of suitable quinones include benzoquinone, 2-tert butyl-1,4-benzoquinone; 2-phenyl-1,4-benzoquinone; naphthoquinone, and 2,5-dichloro-1,4-benzoquinone. Examples of metal deactivators include N,N'-bis(3,5-di-tert-butyl-4-hydroxyhydrocinnamoyl)hydrazine; oxalyl bis(benzylidenehydrazide); and N-phenyl-N'-(4-toluenesulfonyl)-p-phenylenediamine. Nitroxyl radical compounds such as TEMPO (2,2,6,6-tetramethyl-1-piperidnyloxy, free radical) are also effective as inhibitors at low concentrations. The total amount of antioxidant plus synergists typically falls in the range of 100 to 2000 ppm relative to the weight of total base resin. Other additives, such as adhesion promoters, in types and amounts known in the art, may also be added.

The adhesive compositions, such as die-attach paste adhesives, described herein will generally perform within the commercially acceptable ranges for die attach adhesives. Commercially acceptable values for die shear for the adhesives on a 80×80 mil$^2$ silicon die are in the range of greater than or equal to 1 kg at room temperature, and greater than or equal to 0.5 kg at about 260° C. Acceptable values for warpage for a 500×500 mil$^2$ die are in the range of less than or equal to 70 Nm at room temperature.

Fillers.

In some embodiments, fillers are contemplated for use in the practice of the present invention, which can be electrically conductive and/or thermally conductive, and/or fillers, which act primarily to modify the rheology of the resulting composition. Examples of suitable electrically conductive fillers that can be employed in the practice of the present invention include silver, nickel, copper, aluminum, palladium, gold, graphite, metal-coated graphite (e.g., nickel-coated graphite, copper-coated graphite, and the like), and the like. Examples of suitable thermally conductive fillers that can be employed in the practice of the present invention include graphite, aluminum nitride, silicon carbide, boron nitride, diamond dust, zinc oxide, alumina, and the like. Compounds which act primarily to modify rheology include polysiloxanes (such as polydimethyl siloxanes), silica, fumed silica, fumed alumina, fumed titanium dioxide, calcium carbonate and the like.

The invention will now be further described with reference to by the following illustrative, non-limiting examples.

EXAMPLES

Example 1

Acrylate-Methacrylate Polyurethane

In a three-neck 500 mL round bottomed flask, equipped with a thermocouple attached to a temperature controller and a mechanical stirrer, was placed about 45.0 g of Priplast-3196 (Croda Coatings & Polymers, UK), about 60.0 g of dimer diol, about 9.8 g of tricyclodecane dimethanol and about 31.5 g of CAPA™ 2025 (Perstorp). To the flask was also added about 25.0 g of MDI, about 58.0 g of DDI 1410 and about 42.0 g of TMDI. The flask was placed in a heating mantle and stirred vigorously while increasing the temperature to about 100° C. for about two hours to complete the reaction of the isocyanate-capped polyurethane. The temperature was decreased to about 80° C. and about 23.8 g of hydroxyethyl acrylate and about 6.7 g of hydroxyethyl methacrylate along with about 0.32 g of butylated hydroxytoluene (BHT; Aldrich, Milwaukee, Wis.) were added to the flask. The mixture was heated up to about 100° C. for about 20 hours to complete the reaction of the acrylate-methacrylate polyurethane.

Example 2

Acrylated Polyurethane

A 500 mL, three-neck flask was charged with about 108.0 g (0.200 mol) of dimer diol, about 9.8 g (0.050 mol) of tricyclodecane dimethanol and about 131.0 g (0.500 mol) of H$_{12}$MDI. The flask was equipped with a mechanical stirrer, and temperature controller. The mixture was stirred and slowly the temperature was raised to about 100° C., and was held at that temperature for about 3 hours to complete the formation of the isocyanate capped polyurethane. Hydroxyethyl acrylate (about 60.9 g, 0.525 mol) was slowly added to the stirred material along with 1000 ppm of BHT. The material was allowed to stir at about 100° C. overnight (about 16 hours) to complete the reaction. The IR spectrum showed the complete disappearance of the isocyanate peak.

Example 3

Hydrogenated Polybutadiene Diacrylate

A 2 L flat-bottomed flask, equipped with a Teflon® coated stir bar was charged with about 400 g (0.200 mol) of hydroxyl terminated polybutadine (MW=2,000). To the flask was also added about 1 L of heptane, and the mixture was heated and stirred to dissolve the thick resin. Once dissolved, about 1,000 ppm of BHT was added to the solution, along with about 32.4 g (0.450 mol) of acrylic acid, and about 1.0 g of methanesulfonic acid. A Dean-Stark trap was attached to the flask and the solution was heated to reflux for approximately 3 hours to complete the condensation reaction. The solution was cooled down to room temperature, and approximately about 20 g of sodium bicarbonate powder was added to the solution. The slurry was stirred for an additional about 2 hours to neutralize the acid. The material was then flash filtered through a glass-fritted funnel packed with about 50 g of silica gel. The solvent was removed under reduced pressure using a rotary evaporator, followed by air sparge of the resin to get rid of last traces of solvent. Approximately 400 g of the acrylated hydrogenated polybutadine was collected. The material was a clear and colorless thick resin with no odor.

Example 4

Polystyrene-Co-Allyl Alcohol Cyclohexyl Ester/Acrylate

A 1 L flat-bottomed flask, equipped with a Teflon® coated stir bar and dean-stark trap was charged with about 110 g (0.500 eq. OH) of polystyrene-co-allyl alcohol (SAA-101, from Lyondell Chemical of the Netherlands). The polymer was dissolved in 600 mL of toluene using heat and agitation.

Cyclohexane carboxylic acid (about 48.0 g, 0.375 mol) was added to the stirred solution along with about 1.0 g of methanesulfonic acid. The solution was heated to reflux and the water from the condensation reaction was collected in the Dean-Stark trap. After about 2 hours of reflux, the theoretical amount of water was collected, and the solution was allowed to cool down below the reflux temperature. BHT (about 1,000 ppm) was added to the solution, along with about 10.1 g (0.140 mol) of acrylic acid. The solution was reheated to reflux for an additional about 2 hours to convert the remaining alcohol groups to the acrylates. After cooling down to room temperature, approximately 20 g of sodium bicarbonate powder was added to the flask and stirred vigorously for about 2 additional hours to neutralize the acid. The slurry was then flash filtered through a glass-fritted filter packed with about 40 g of silica gel. The toluene was removed under vacuum using a rotary evaporator; this was followed by air sparge for about 2 hours at about 70° C. to remove the last traces of solvent. Approximately 140 g of an amber colored thick resin was collected, which turned to a glassy solid after cooling.

Example 5

Polyacrylate Urethane

A 500 mL, three-neck flask equipped with a mechanical stirrer, and temperature controller was charged with about 54.6 g (0.30 mol) of the homopolymer of hexamethylene diisocyante. To the flask was added about 1,000 ppm of BHT, along with about 23.2 g (0.200 mol) of hydroxyethyl acrylate. The material was stirred and heated to about 90-100° C. for approximately 3 hours to convert at least two of the isocyantes to the urethane linkages. At this point, about 27.0 g (0.05 mol) of dimer diol was added to the flask, and the material was heated to about 100° C. over about 3 additional hours to convert the remaining isocyanate linkages to the urethane. After cooling down, a thick clear resin was obtained.

Example 6

4,4'-Isopropylidenedicyclohexylbis-3-(Mercapto Propionate)

A 500 mL, one-neck flask was charged with about 24.0 g (0.100 mole) 4,4'-isopropylidenedicyclohexanol, about 23.35 g (0.220 mole) 3-mercaptopropionic acid, about 150 mL toluene and about 1.0 g of methanesulfonic acid. A magnetic stir bar was added and the flask was equipped with a Dean-Stark trap, condenser, and a bubbler. The mix was then refluxed for about 2.5 hours under an argon blanket to collect about 4.0 mL (theory, 3.6 mL) $H_2O$. The reaction mix was cooled to room temperature and then stirred with about 10 g $NaHCO_3$ and about 3 g $H_2O$ to neutralize residual acid. The mix was then dried with about 7.5 g $MgSO_4$ and passed over about 20 g of silica gel. The toluene was removed on a rotary evaporator-using vacuum followed by air sparge to give about 40.4 g (97% of theory) of a clear, light-yellow, viscous liquid. The product eventually crystallized to a soft waxy solid after standing for several weeks at room temperature. An Fourier transform infrared spectroscopy (FTIR) trace run on this material showed the presence of prominent absorptions at 2939, 2866, 1721, 1368, 1246, 1187, 1041, 1013, 904, and 679 wavenumbers. Thermogravimetric analysis (TGA) was run on this compound (ramp rate=10° C. per minute, air purge). The retained weight at 100° C. and 200° C. was 100.0% and 98.74%, respectively. The onset for decomposition was 303.8° C.

Example 7

Formulation 1

The acrylate-methacrylate polyurethane from EXAMPLE 1 (about 59% by weight), trimethylolpropane tris(3-mercaptopropionate) (about 10% by weight), phenoxyethyl methacrylate (about 30% by weight) and the balance of IRGACURE 819 (BASF, Ludwigshafen, Germany) were mixed thoroughly and degased. The viscosity of the mixture was approximately 4,200 cps. The material was placed in a dog bone shaped mold and degased again and finally cured under ultraviolet radiation. The cured material was found to be very soft and rubbery. The material was tested for tensile strength and elongation using an Instron machine. The tensile strength of the material was approximately 200 psi, with an elongation at break of about 200%.

Example 8

Formulation 2

The acrylate-methacrylate polyurethane from EXAMPLE 1 (about 47% by weight), tricyclodecane dimethanolbis-3-(mercaptopropionate) (about 18% by weight), phenoxyethyl methacrylate (34% by weight) and the balance of IRGACURE° 819 were mixed together thoroughly and degassed. The material had a viscosity of approximately 3,000 cps. The material was placed in a dog bone shaped mold, and degassed some more. The material was then placed under ultraviolet radiation to cure the sample. The cured material was very rubbery and soft (very low modulus). The material was tested for elongation and tensile strength using an Instron machine. The material had an ultimate elongation of approximately 1,000% and a tensile strength of about 50 psi.

Example 9

Formulation 3

The acrylate-methacrylate polyurethane from EXAMPLE 1 (about 47% by weight), the 4,4'-isopropylidenedicyclohexylbis-3-(mercapto propionate) from EXAMPLE 2 (about 20% by weight), phenoxyethyl methacrylate (about 32% by weight) and the balance of IRGACURE° 819 were mixed thoroughly and degassed. The viscosity of the material was approximately 4,200 cps. The material was placed in a dog bone shaped mold, degassed some more and UV cured. The material was tested for tensile strength and elongation. The material had an elongation of approximately 800% and a tensile strength of about 60 psi.

Example 10

Formulation 4

The acrylate-methacrylate polyurethane from EXAMPLE 1 (about 55% by weight), the 4,4'-isopropyldenedicyclohexylbis-3-(mercapto propionate) from EXAMPLE 2 (about 15% by weight), phenoxyethyl methacrylate (about 24% by weight), mercaptopropyl trimethoxysilane (about 5% by weight) and the balance of IRGACURE° 819 were mixed together thoroughly and degassed. The viscosity of the material was approximately 25,000 cps. A couple of drops of the material were placed on a glass slide, and Kapton polyimide film was placed on top of the resin and pressed down to make a film. The material was placed in a UV chamber and cured through the glass. The material was tested on an Instron instrument for 180° peel strength. The failure mode was mixed with resin left on both the glass and the Kapton, and the peel strength was measured at 12-20 N/cm.

Example 11

Formulation 5

The acrylated polyurethane of EXAMPLE 2 (about 25 wt %), the tackifier described in EXAMPLE 4 (about 21 wt %), 4,4'-isopropylidenedicyclohexylbis-3-(mercapto propionate) (about 20 wt %), dimer diol bis-3-(mercapopropionate) (about 20 wt %), methacryloxypropyl trimethoxysilane (about 1 wt %), tricyclodecane dimethanol diacrylate (about 8 wt %) and the balance of isobornyl acrylate (5 wt %) were thoroughly mixed together. Approximately 2 wt % IRGACURE° 819 was dissolved in the resin and thoroughly degassed. The resin system had a viscosity of about 10,000 cps at room temperature.

The resin system described above was placed on a glass slide and the resin was spread evenly using a doctor blade technique to a bond-line thickness of 40-50 microns. A thin strip of polyimide film (Kapton® film) was placed on top and squeezed down to press out all of the air bubbles. The glass/polyimide assembly was turned upside down and the adhesive was UV cured through the glass. The adhesive was tested for 90° T-peel. It was found that the peel strength of the adhesive was 13-18 N/cm. The assembly was also placed in a humidity chamber at about 85° C. and about 85% relative humidity. The peel strength was again tested after the exposure to hot wet conditions and found to be 12-15 N/cm after about 500 hours exposure to heat and humidity.

Example 12

Formulation 6

This low viscosity formulation once cured produces a polymer with high tensile strength, good flexibility, excellent temperature resistance and excellent chemical resistance. The polyacrylate urethane of EXAMPLE 3 (about 33 wt %), tricyclodecane diacrylate (about 43 wt %), tricyclodecane dimethanol bis-3-(mercaptopropionate) (about 13 wt %), dimer diol bis-3-(mercaptopropionate) (about 11 wt %) and the balance of IRGACURE° 819 were thoroughly mixed and degassed. The formulation had a viscosity of about 2,000 cps at room temperature. The material was placed in a dog bone shaped mold and degassed fully. After UV curing, the polymer was tested for tensile strength and elongation. The polymer had a tensile strength of about 2,500 psi, and elongation at break of about 65%.

The polymer of EXAMPLE 8 was also placed in an oven at about 255° C. for about 1 hour. At the end of the hour the polymer was weighed and found to have only lost about 1.5% weight, with no visible sign of heat degradation.

The polymer of EXAMPLE 8 was also placed in a 2 wt % potassium hydroxide aqueous/N-methylpyrollidone batch. The bath was heated to about 90° C. overnight (about 16 hours). The polymer was found to be in pristine shape after the test, with only about 1% weight gain.

Example 13

Formulation 7, Clear Non-Yellowing, Low Modulus Formulation

The hydrogenated polybutadiene acrylate from EXAMPLE 3 (about 37 wt %) was mixed with about 50 wt % hydrogenated polybutadiene diol-bis-3-(mercaptopropionate). To the resin was also added mercaptopropyltrimethoxysilane (about 1 wt %), isobornylacrylate (about 12 wt %) and the balance of photopolymerization initiator. The viscosity of the resin was measured at about 3,500 cps. The resin was thoroughly mixed and degassed; the material was placed in a dog bone shaped mold and degassed more to remove any air bubbles. After UV curing, the properties of the polymer were tested. The clear, colorless polymer (% transmittance of about 99.8% from 380 to 780 nm), and had a tensile strength of about 60-80 psi and about 250% elongation at break. The polymer was found to be very soft (Shore E hardness of 21) with a low modulus. The dielectric constant was found to be low (about 2.41 at 1 Mhz) as well, which makes this material ideal for an adhesive for image display devices.

The resin system in EXAMPLE 9 was tested for adhesion between glass/glass, glass/polycarbonate, and glass to acrylic surfaces. The testing was done by placing a drop of the adhesive sandwiched between two glass slides at a bond line thickness of about 100 microns. The resin was UV cured, and the adhesion was measured by pulling apart the glass slides using an Instron machine. Similarly the adhesion between glass and polycarbonate, and glass to acrylic was measured. The tensile adhesion for glass/glass, glass/polycarbonate, and glass/acrylic were all found to be between about 75 and 100 psi.

The following Table 1 contains the viscosity, tensile strength, and % elongation for each of the formulated EXAMPLES. As is clear from the data, the invention provides an excellent method for producing fairly low viscosity formulations that exhibit a wide variety of tensile strength and elongation. The formulated products contain no solvents, and the components are all fairly high molecular to minimize the vapor pressure of the uncured resin. To get adhesion to a wide variety of substrates, one needs to be able to change the tensile strength and the % elongation of the cured polymer. The data presented in Table 1 show that this has been achieved. Some surfaces are very difficult to adhere to; this includes most plastics and many metals. It is generally known that more flexible adhesives adhere to these surfaces much better than hard adhesives, especially in a peel test.

TABLE 1

Properties of Example Formulations

| Resin Composition | Viscosity (cps) | Tensile Strength (psi) | % Elongation |
| --- | --- | --- | --- |
| Formulation 1 | 4200 | 200 | ~200 |
| Formulation 2 | 3000 | 50 | ~1000 |
| Formulation 3 | 4200 | 60 | ~800 |
| Formulation 4 | 25000 | 120 | ~500 |
| Formulation 5 | 10000 | 60 | ~800 |
| Formulation 6 | 2000 | 2500 | ~65 |
| Formulation 7 | 3500 | 70 | ~250 |

Although the foregoing invention has been described in some detail by way of illustration and example for purposes of clarity and understanding, it will be apparent to those of ordinary skill in the art in light of the teaching of this invention that certain changes and modifications may be made thereto without departing from the spirit or scope of the appended claims.

What is claimed is:
1. A curable adhesive composition comprising:
 (a) at least one functionalized polyurethane;
 (b) at least one thiol functionalized compound;
 (c) at least one reactive diluent; and
 (d) at least one free-radical initiator,
 wherein the functionalized polyurethane is selected from the group consisting of

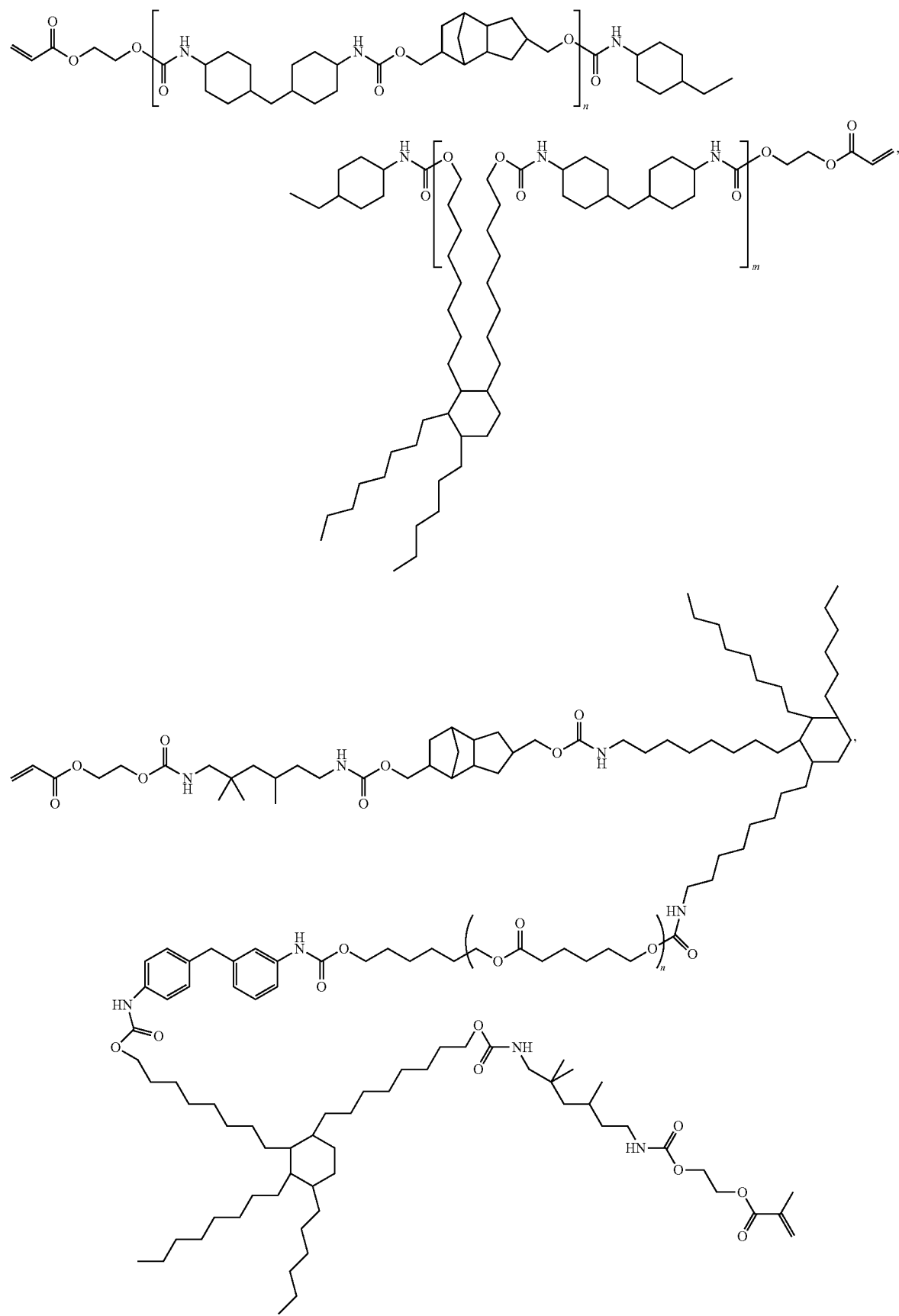

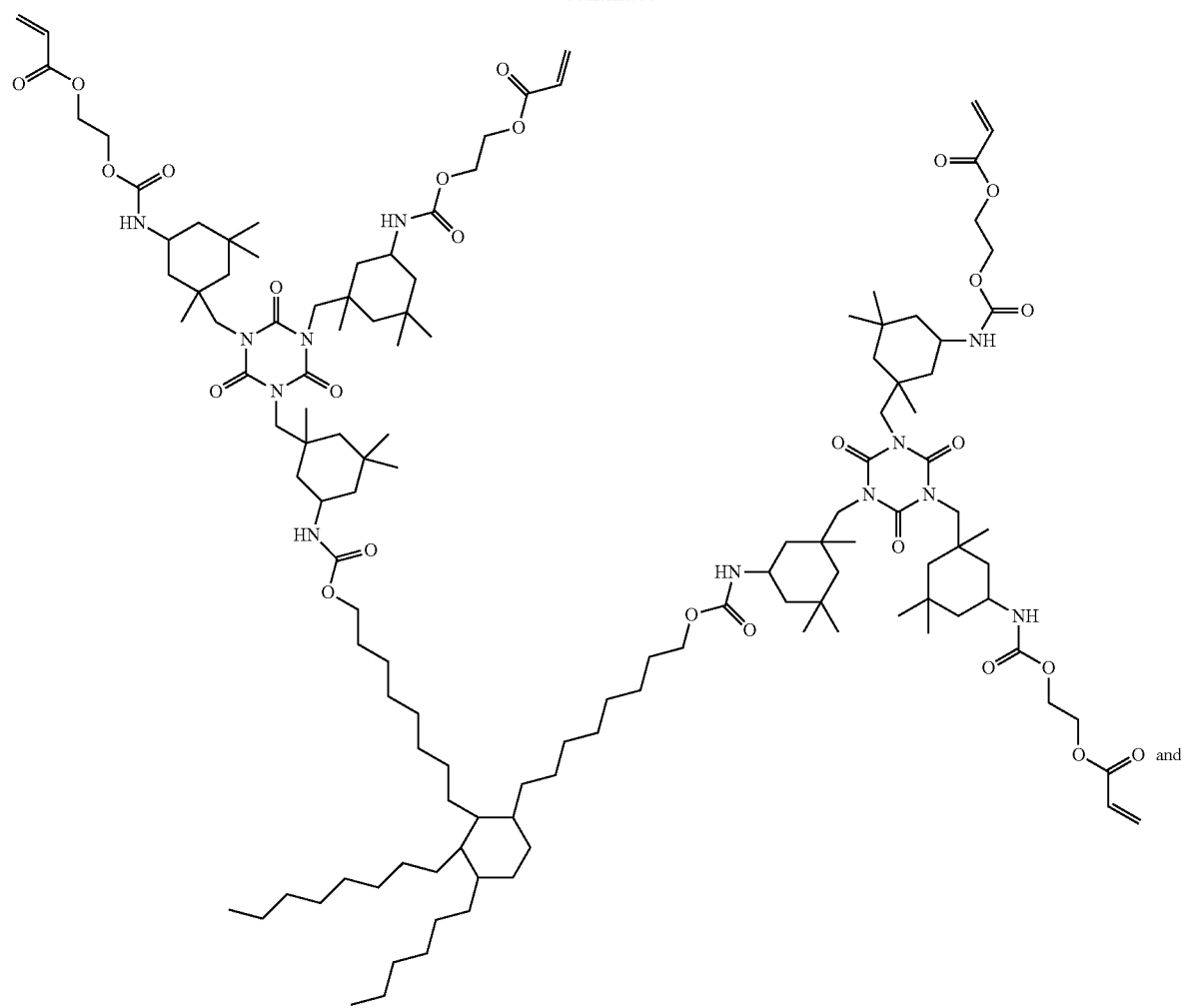

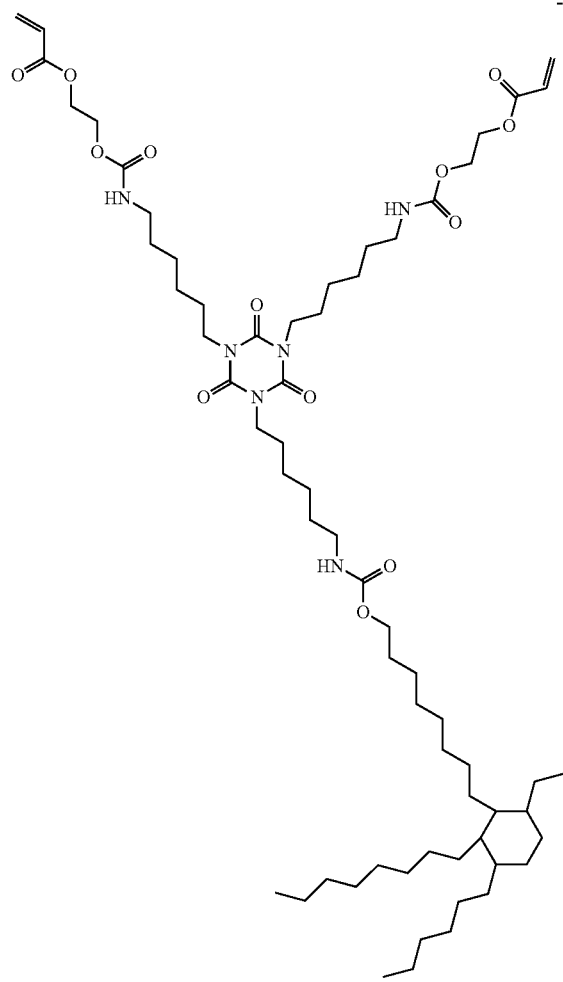
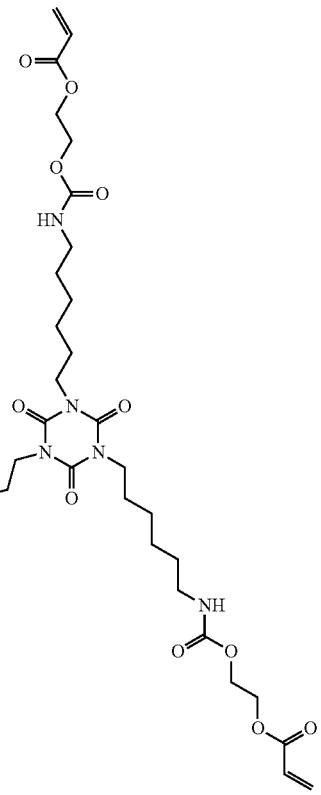

wherein each m and n is an integer having the value between 1 and 4.

2. The composition of claim 1, wherein the viscosity of the composition is between about 100 cps and about 25,000 cps at room temperature.

3. The composition of claim 1, wherein the functionalized polyurethane comprises between about 2 and about 90 weight percent of the total weight of the composition.

4. The composition of claim 1, wherein the thiol functionalized compound is selected from the group consisting of 1,2-ethanedithiol, 1,3-propanedithiol, 2-mercaptoethyl ether, 2,3-butanediothiol, 2,2'-thiodiethanethiol, 1,5-pentanedithiol, benzene-1,3-dithiol, benzene-1,2-dithiol, 1,6-hexanedithiol, toluene-3,4-dithiol, 1,2-benzenedimethanethiol, 1,3-benzenedimethanethiol, 1,4-benzenedimethanethiol, 2,4,6-trimethyl-1,3-benzenedimethanethiol, biphenyl-4,4'-dithiol, 4,4'-dimercaptostilbene, 4,4'-bis(mercaptomethyl)biphenyl, trimethylolpropane tris(mercaptopropionate), 1,16-hexadecanedithiol and p-terphenyl-4,4'-dithiol.

5. The composition of claim 1, wherein the thiol functionalized compound is selected from the group consisting of

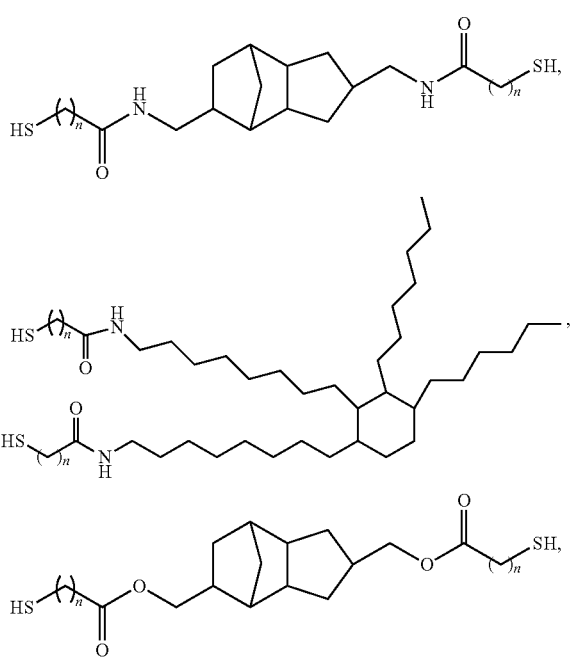

-continued

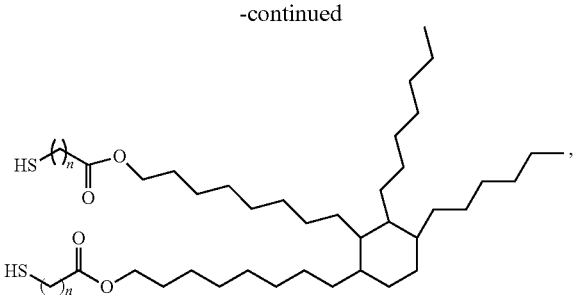

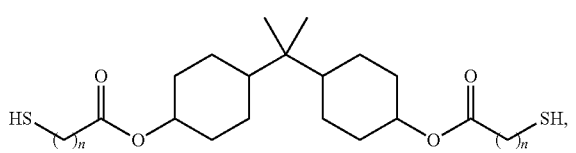

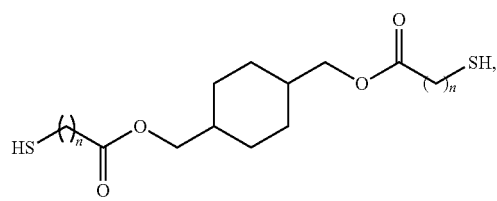

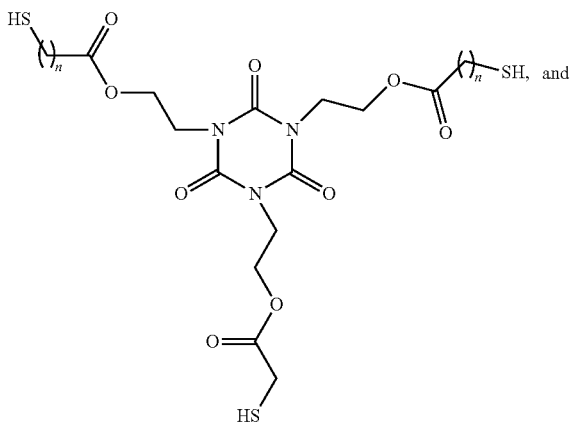

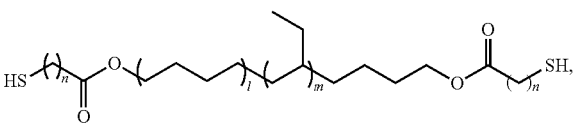

wherein n is an integer having the value of 1 or 2 and m is an integer having the value between 1 and about 1,000 and l=1.

6. The composition of claim 1, wherein the thiol functionalized compound comprises between about 2 and about 70 weight percent of the total weight of the composition.

7. The composition of claim 2, comprising between about 0.1% and about 5% free radical initiators or photoinitiators.

8. The composition of claim 2, comprising between about 0.1% and about 5% coupling agent or adhesion promoter.

9. The composition of claim 1, wherein the adhesive composition exhibits at least 30% elongation when cured.

10. The composition of claim 1, wherein said composition, when cured, has tensile adhesion to plastics of at least 75 psi.

11. The composition of claim 10, wherein the plastic is selected from the group consisting of polyamide, polyurethane, acrylic, polytetrafluoroethylene, polyvinyl chloride, polystyrene, polypropylene, and polyethylene, acrylonitrile butadiene styrene, polycarbonate, polybutylene terephthalate, polyethylene terephthalate, polyphenylene oxide, polysulphone, polyetherketone, polyetheretherketone, polyimide, polyphenylene sulfide and polyoxymethylene.

12. The composition of claim 1, wherein the reactive diluent comprises between about 1 wt % and about 50 wt % based on the total weight of the composition.

13. A curable adhesive composition comprising:
(a) at least one functionalized polyurethane;
(b) at least one thiol functionalized compound;
(c) at least one reactive diluent; and
(d) at least one free-radical initiator,
wherein functionalized polyurethane has the structure according to formula II $$(M^*)_2 Tri^* diol^* Tri(^*M)_2 \qquad \text{II}$$

wherein:
each Tri is independently a triradical residue of a triisocyanate;
diol is a diradical residue of a diol;
each (*) indicates a linkage selected from the group consisting of —NH—CO—NH—, —COO— and —O—CO—NH—;
n is an integer indicating the number of blocks of the polymer; and
each M is an independently polymerizable ethylenically unsaturated radical of the structure E-(R)-(Q)-, wherein:
each of R and Q is independently selected from the group consisting of a substituted or an unsubstituted aliphatic, aryl and heteroaryl; and
E is independently selected from the group consisting of an acrylate, a methacrylate, maleimide, a styrenic, a vinyl ester, an olefin, allyl, vinyl ether, itaconate and fumarate.

14. The composition of claim 13, wherein the functionalized polyurethane comprises between about 2 and about 90 weight percent of the total weight of the composition.

15. The composition of claim 13, wherein the thiol functionalized compound is selected from the group consisting of 1,2-ethanedithiol, 1,3-propanedithiol, 2-mercaptoethyl ether, 2,3-butanedithiol, 2,2'-thiodiethanethiol, 1,5-pentanedithiol, benzene-1,3-dithiol, benzene-1,2-dithiol, 1,6-hexanedithiol, toluene-3,4-dithiol, 1,2-benzenedimethanethiol, 1,3-benzenedimethanethiol, 1,4-benzenedimethanethiol, 2,4,6-trimethyl-1,3-benzenedimethanethiol, biphenyl-4,4'-dithiol, 4,4'-dimercaptostilbene, 4,4'-bis(mercaptomethyl)biphenyl, trimethylolpropane tris(mercaptopropionate), 1,16-hexadecanedithiol and p-terphenyl-4,4'-dithiol.

16. The composition of claim 13, wherein the thiol functionalized compound is selected from the group consisting of

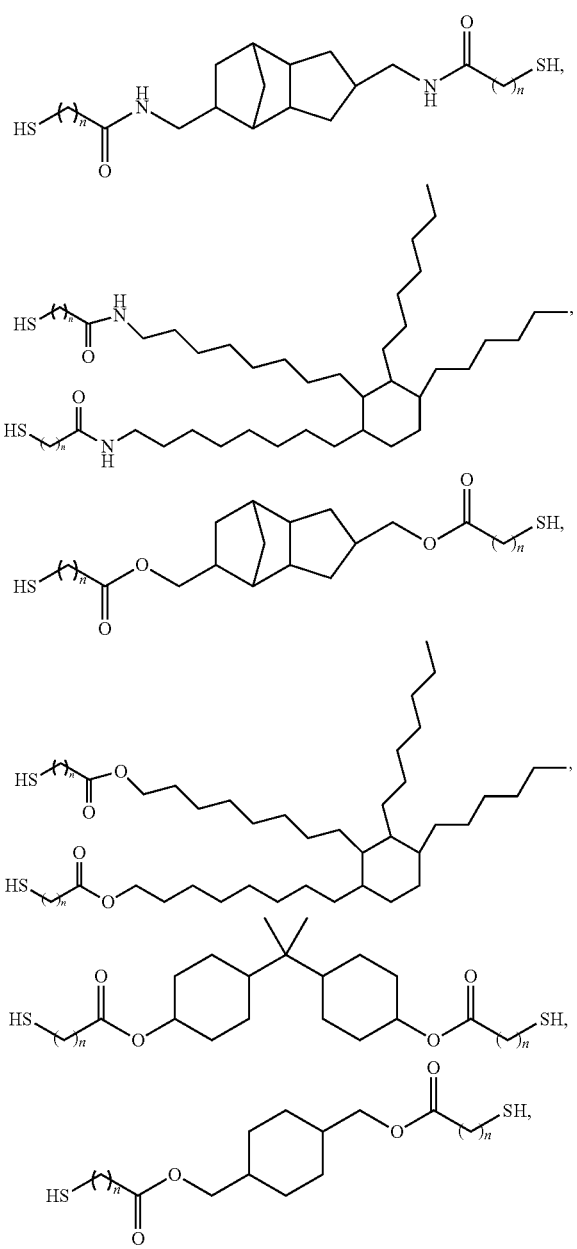

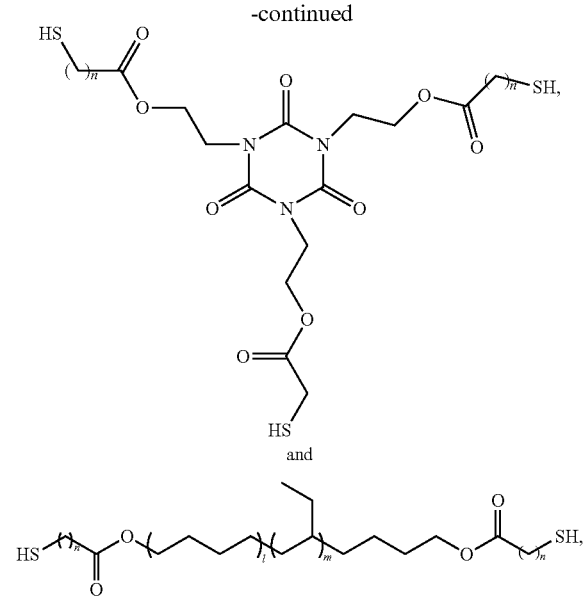

wherein n is an integer having the value of 1 or 2 and m is an integer having the value between 1 and about 1,000 and l=1.

17. The composition of claim 13, wherein the thiol functionalized compound comprises between about 2 and about 70 weight percent of the total weight of the composition.

18. The composition of claim 13, wherein the adhesive composition exhibits at least 30% elongation when cured.

19. The composition of claim 13, wherein said composition, when cured, has tensile adhesion to plastics of at least 75 psi, wherein the plastic is selected from the group consisting of polyamide, polyurethane, acrylic, polytetrafluoroethylene, polyvinyl chloride, polystyrene, polypropylene, and polyethylene, acrylonitrile butadiene styrene, polycarbonate, polybutylene terephthalate, polyethylene terephthalate, polyphenylene oxide, polysulphone, polyetherketone, polyetheretherketone, polyimide, polyphenylene sulfide and polyoxymethylene.

20. The composition of claim 13, wherein the reactive diluent comprises between about 1 wt % and about 50 wt % based on the total weight of the composition.

* * * * *